(12) United States Patent
Horiguchi et al.

(10) Patent No.: US 10,040,478 B2
(45) Date of Patent: Aug. 7, 2018

(54) VEHICLE

(71) Applicant: EQUOS RESEARCH CO., LTD., Tokyo (JP)

(72) Inventors: Munehisa Horiguchi, Tokyo (JP); Akira Mizuno, Tokyo (JP); Masaki Okada, Tokyo (JP); Hitoshi Kamiya, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 0 days.

(21) Appl. No.: 15/512,673

(22) PCT Filed: Feb. 16, 2016

(86) PCT No.: PCT/JP2016/054450
§ 371 (c)(1),
(2) Date: Mar. 20, 2017

(87) PCT Pub. No.: WO2016/143471
PCT Pub. Date: Sep. 15, 2016

(65) Prior Publication Data
US 2017/0291637 A1      Oct. 12, 2017

(30) Foreign Application Priority Data

Mar. 6, 2015   (JP) .................................. 2015-044516
Mar. 24, 2015  (JP) .................................. 2015-060553

(51) Int. Cl.
  *B62D 9/02*    (2006.01)
  *B62K 5/027*   (2013.01)
  *B62K 5/10*    (2013.01)

(52) U.S. Cl.
  CPC ................ *B62D 9/02* (2013.01); *B62K 5/027* (2013.01); *B62K 5/10* (2013.01); *B62K 2204/00* (2013.01)

(58) Field of Classification Search
CPC . B62D 9/02; B62K 5/10; B62K 5/027; B62K 2204/00
See application file for complete search history.

(56) References Cited

U.S. PATENT DOCUMENTS 7,647,999 B2 *  1/2010  Geiser .............. B60G 17/01908
                                              180/210
8,050,820 B2 * 11/2011  Yanaka .................... B60G 3/01
                                              180/41

(Continued)

FOREIGN PATENT DOCUMENTS

JP    H05-147554 A      6/1993
JP    2011042199 A  *   3/2011

(Continued)

OTHER PUBLICATIONS

May 17, 2016 International Search Report issued in Patent Application No. PCT/JP2016/054450.

(Continued)

*Primary Examiner* — Jacob B Meyer
(74) *Attorney, Agent, or Firm* — Oliff PLC

(57) ABSTRACT

A vehicle body having three or more wheels including at least a steered wheel with a trail and a pair of wheels provided in the vehicle width direction; an operation input part inputting a turning direction; an inclining part inclining the body; and a steered wheel controller controlling the steered wheel steering angle. When the vehicle speed is lower than a predetermined speed, it travels in a first mode in which the steered wheel controller controls the steered wheel steering angle according to an operation input part input, and the inclining part inclines the body according to an operation input part input. When the vehicle speed is equal to or higher than the predetermined speed, it travels in a second mode in which the steered wheel controller makes (Continued)

the steered wheel freely turnable, and the inclining part inclines the body according to an input from the operation input part.

10 Claims, 16 Drawing Sheets

(56) References Cited

U.S. PATENT DOCUMENTS

| | | | | |
|---|---|---|---|---|
| 8,141,890 B2* | 3/2012 | Hughes | ............... | B60G 21/007 180/210 |
| 8,627,915 B2* | 1/2014 | Tsukamoto | ............ | B60L 15/20 180/21 |
| 8,640,810 B2* | 2/2014 | Tsukamoto | ............ | B62K 11/10 180/220 |
| 8,893,833 B2* | 11/2014 | Tsukamoto | ............ | B62K 11/10 180/220 |
| 9,037,347 B2* | 5/2015 | Hayashi | ............... | B60G 17/015 313/146 |
| 9,327,569 B2* | 5/2016 | Uebayashi | ............... | B60G 3/26 |
| 9,381,785 B2* | 7/2016 | Gale | .................. | B60G 3/145 |
| 2007/0193803 A1* | 8/2007 | Geiser | ............... | B60G 17/01908 180/215 |
| 2008/0238005 A1* | 10/2008 | James | ..................... | B62D 9/02 280/5.509 |
| 2008/0290618 A1* | 11/2008 | Yanaka | .................... | B60G 3/01 280/6.15 |
| 2010/0044977 A1* | 2/2010 | Hughes | ............... | B60G 21/007 280/5.509 |
| 2010/0324808 A1* | 12/2010 | Moulene | .......... | B60G 17/01908 701/124 |
| 2013/0068550 A1* | 3/2013 | Gale | ...................... | B60G 3/145 180/216 |
| 2013/0153323 A1* | 6/2013 | Tsukamoto | ............. | B60L 15/20 180/220 |
| 2013/0175102 A1* | 7/2013 | Tsukamoto | ............. | B62K 11/10 180/21 |
| 2013/0304318 A1* | 11/2013 | Hayashi | ............... | B60G 17/015 701/37 |
| 2014/0129086 A1* | 5/2014 | Takenaka | ............... | B62D 6/003 701/41 |
| 2014/0312580 A1 | 10/2014 | Gale | | |
| 2015/0158360 A1* | 6/2015 | Uebayashi | ............... | B60G 3/26 280/5.508 |
| 2016/0251051 A1* | 9/2016 | Malphettes | ............... | B60G 3/20 280/788 |
| 2016/0280307 A1* | 9/2016 | Takenaka | ............... | B62K 21/00 |
| 2016/0375948 A1* | 12/2016 | Takenaka | ................ | B62K 5/10 280/5.506 |
| 2017/0291637 A1* | 10/2017 | Horiguchi | ................ | B62D 9/02 |

FOREIGN PATENT DOCUMENTS

| | | | |
|---|---|---|---|
| JP | 2012017009 A | * | 1/2012 |
| JP | 2013-071688 A | | 4/2013 |
| JP | 2013-233895 A | | 11/2013 |
| JP | 2014-524864 A | | 9/2014 |
| JP | 2016165986 A | * | 9/2016 |
| WO | 2005/075278 A1 | | 8/2005 |
| WO | WO-2005075278 A1 | * | 8/2005 ............... B62D 9/02 |

OTHER PUBLICATIONS

Jan. 21, 2017 PCT Third Party Observation issued in Japanese Patent Application No. PCT/JP2016/054450.

* cited by examiner

Lean angle/steering angle control with respect to steering wheel angle

Determine lean angle: $\theta$ from steering wheel angle: $\delta_H$ (1) Determine front wheel steering angle: $\delta_W 1$ at maximum vehicle speed V1
when lean angle is fixed to 0 from steering wheel angle: $\delta_H$ (2) Determine front wheel steering angle: $\delta_W 2$ at vehicle speed V2 at mode switching from steering wheel angle : $\delta_H$ Flowchart for calculating front wheel steering angle: $\delta_W 2$ at mode switching View for explaining problem at switching from second mode to first mode

VEHICLE

TECHNICAL FIELD

The present invention relates to a vehicle having a vehicle body provided with three or more wheels including a steered wheel with a trail.

BACKGROUND ART

In recent years, reduction in fuel consumption has been strongly demanded for vehicles in consideration of resource exhaustion issues. On the other hand, the number of vehicle owners has been increasing along with reduction in vehicle cost, and the current trend is "one car for one person". Thus, for example, when only one person (driver) drives a 4-seater vehicle, energy is wastefully consumed. To achieve reduction in fuel consumption by making a vehicle compact, it is most effective to design a vehicle as a single-seated three-wheeled vehicle or a single-seated four-wheeled vehicle.

In such a case, however, vehicle stability may deteriorate depending on traveling conditions. To cope with this, there is proposed a technology that improves vehicle stability during turning by laterally inclining (leaning) a vehicle body.

For example, Patent Document 1 (JP 2013-233895A) discloses a vehicle having a configuration to incline a vehicle body, in which drive force of a wheel motor for left and right wheels is controlled by input from an operation lever to incline the vehicle body, and a steered wheel is turned naturally in the direction in which the vehicle body is inclined.

Patent Document 2 (JP 2013-71688A) discloses the following technology. That is, a vehicle has a configuration to incline a vehicle body, and the inclination angle of the vehicle body and the actual steering angle of a steered wheel are calculated on the basis of an input from a steering part, a measurement from a vehicle speed sensor, and a measurement from a lateral G sensor to control the inclination angle and actual steering angle using a dedicated motor.

Patent Document 3 (JP 05-147554A) discloses the following technology. That is, to improve fuel consumption by reducing traveling resistance during turning, a pair of steered wheels are leaned by a first steering mechanism, and the steered wheels are steered by a second steering mechanism to thereby perform turning operation.
Patent Document 1: JP 2013-233895A
Patent Document 2: JP 2013-71688A
Patent Document 3: JP 05-147554A

DISCLOSURE OF THE INVENTION

Problems to be Solved by the Invention

In the vehicle described in Patent Document 1, inclining the vehicle body allows the actual steering angle of the steered wheel to be naturally changed in accordance with a vehicle speed and the inclination angle of the vehicle body, thereby making turning. However, although stable traveling is ensured during high-speed traveling, the actual steering angle is not settled during low-speed traveling to result in staggering, which leads to unstable traveling.

In the vehicle described in Patent Document 2, the inclination angle of the vehicle body and the actual steering angle of the steered wheel are controlled using a motor responsive to an input from the steering wheel, a measurement from the vehicle speed sensor, and a measurement from the lateral G sensor, so that the actual steering angle can be made stable even during low-speed traveling, whereby stable traveling can be achieved over the entire vehicle speed range. However, the calculation is made from a detection value of each sensor, a slight response delay occurs. Particularly, during high-speed traveling, when sudden external force such as crosswind is applied, the traveling becomes unstable due to the response delay. This requires appropriate measures such as widening the vehicle width with a view to stable traveling.

In the vehicle described in Patent Document 3, both the first and second steering mechanisms need to be operated. That is, a complicated operation is required, which may lead to unstable traveling.

In conclusion, there is a problem in that it is difficult to achieve stable traveling over the entire vehicle speed range.

The object of the present invention is therefore to realize a vehicle capable of stably traveling over the entire vehicle speed range.

Means for Solving the Problems

To solve the above problems, a vehicle according to the present invention includes: a vehicle body having three or more wheels including at least a steered wheel with a trail and a pair of wheels provided in the vehicle width direction; an operation input part that inputs a turning direction when being operated; an inclining part that inclines the vehicle body; and a steered wheel controller that controls the steering angle of the steered wheel. When the vehicle speed of the vehicle is lower than a predetermined vehicle speed, the vehicle travels in a first mode in which the steered wheel controller controls the steering angle of the steered wheel according to an input from the operation input part, and the inclining part inclines the vehicle body according to an input from the operation input part. On the other hand, when the vehicle speed is equal to or higher than the predetermined vehicle speed, the vehicle travels in a second mode in which the steered wheel controller makes the steered wheel freely turnable irrespective of the operation input part, and the inclining part inclines the vehicle body according to an input from the operation input part.

Further, in the vehicle according to the present invention, in the first mode, the inclination angle of the vehicle body gradually increases along with an increase in the vehicle speed to be the inclination angle of the vehicle body at the predetermined vehicle speed in the second mode.

Further, in the vehicle according to the present invention, a turning radius based on the inclination angle of the vehicle body at the predetermined vehicle speed in the second mode is estimated, then the steering angle of the steered wheel at the predetermined vehicle speed is calculated from the estimated turning radius, and the steered wheel is controlled until the calculated steering angle is reached.

Further, in the vehicle according to the present invention, the operation input part detects an input steering angle which is an angle to be steered, and the inclining part inclines the vehicle body at a constant imaginary gear ratio with respect to the input steering angle in the second mode.

Further, in the vehicle according to the present invention, the steered wheel is a front wheel.

Further, in the vehicle according to the present invention, the inclining part inclines the pair of wheels to incline the vehicle body.

Further, in the vehicle according to the present invention, the vehicle travels in the first mode when being moved back.

Further, in the vehicle according to the present invention, the predetermined speed at switching from the first mode to the second mode and the predetermined speed at switching from the second mode to the first mode differ from each other.

Further, in the vehicle according to the present invention, when a deviation exists by a predetermined value or more between a detected steering angle of the steered wheel and a calculated steering angle of the steered wheel in the second mode, the predetermined vehicle speed at switching from the second mode to the first mode is set higher than the predetermined vehicle speed at switching from the first mode to the second mode.

Further, in the vehicle according to the present invention, when the steering angle of the steered wheel detected at switching from the second mode to the first mode differs from a target steering angle of the steered wheel in the first mode, the steering angle of the steered wheel is corrected so as to continuously approach the target steering angle of the steered wheel.

Further, in the vehicle according to the present invention, the steering angle of the steered wheel at switching from the first mode to the second mode is detected, and a target steering angle of the steered wheel is changed in the first mode according to the steering angle at switching.

Advantages of the Invention

According to the vehicle of the present invention, when the vehicle speed of the vehicle is lower than a predetermined vehicle speed, the vehicle travels in a first mode in which the steered wheel controller controls the steering angle of the steered wheel according to an input from the operation input part, and the inclining part inclines the vehicle body according to an input from the operation input part. On the other hand, when the vehicle speed is equal to or higher than the predetermined vehicle speed, the vehicle travels in a second mode in which the steered wheel controller makes the steered wheel freely turnable irrespective of the operation input part, and the inclining part inclines the vehicle body according to an input from the operation input part. Thus, traveling stability can be ensured over the entire vehicle speed range.

BEST MODE FOR CARRYING OUT THE INVENTION

Hereinafter, an embodiment of the present invention will be described with reference to the accompanying drawings.

Figure 1:
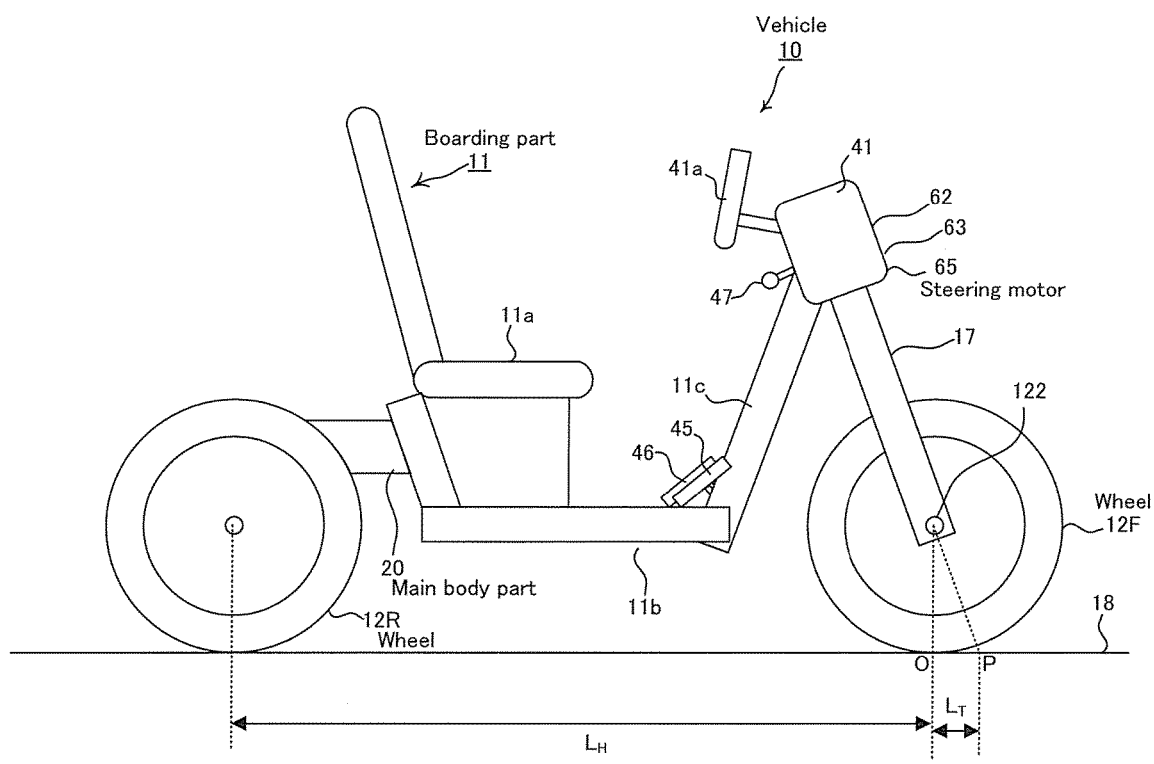
FIG. 1 is a right side view illustrating the configuration of a vehicle 10 according to an embodiment of the present invention.
Figure 2:
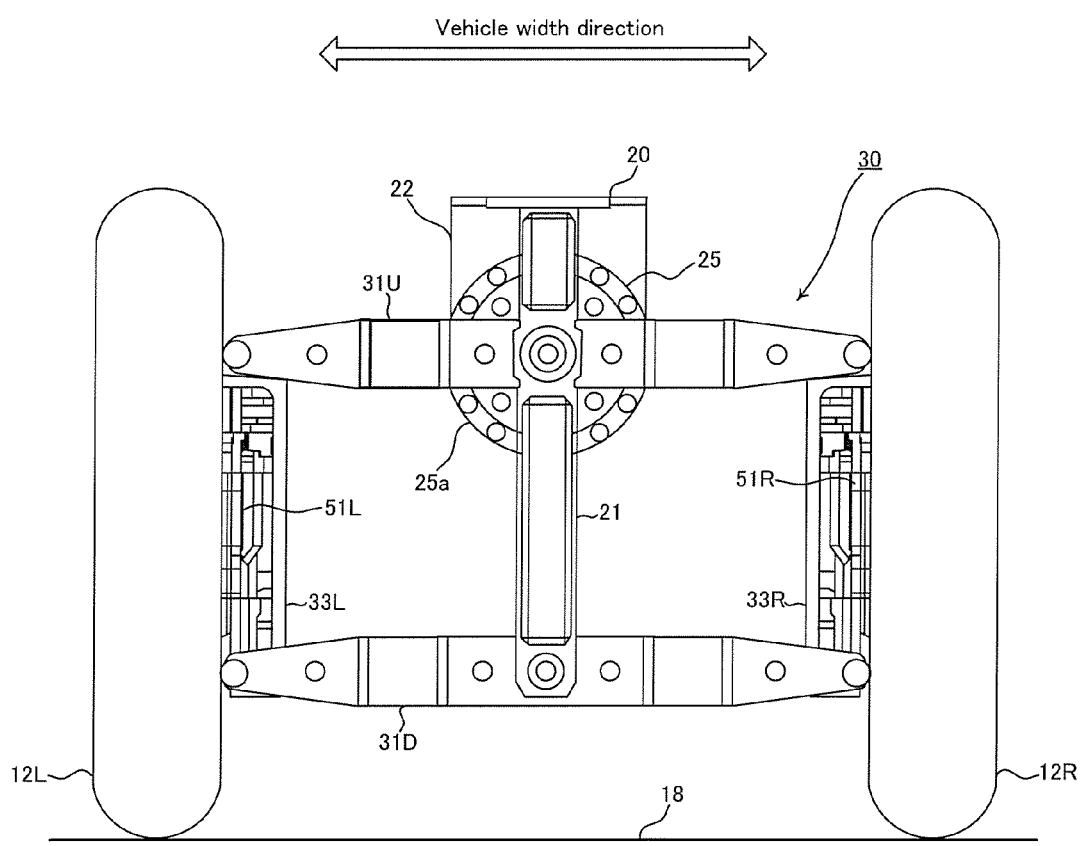
FIG. 2 is a view illustrating the configuration of a lean mechanism of the vehicle 10 according to the embodiment of the present invention.
Figure 3:
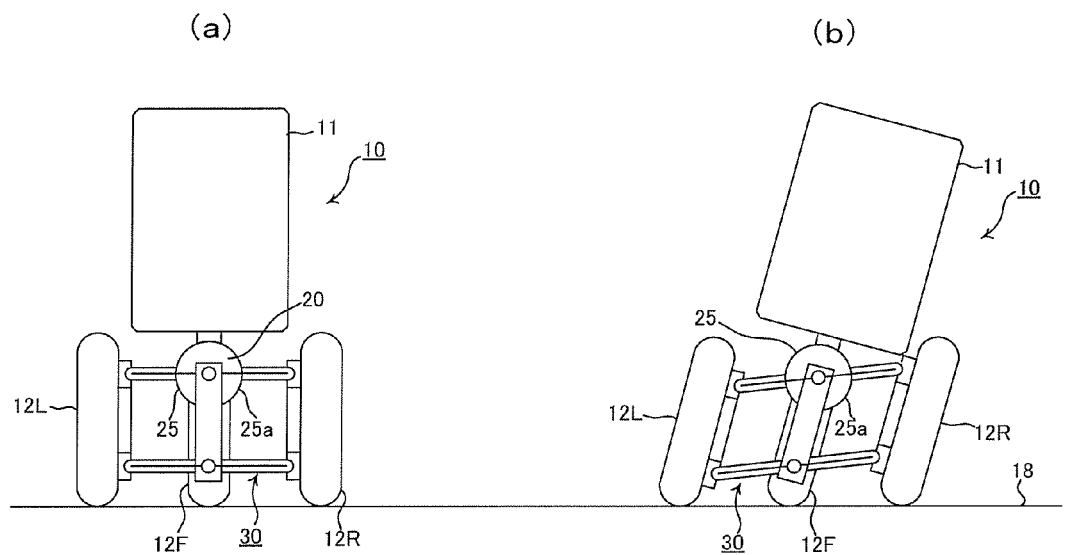
FIGS. 3A and 3B are back views each illustrating the configuration of the vehicle 10 according to the embodiment of the present invention.

FIG. 1 is a right side view illustrating the configuration of a vehicle according to an embodiment of the present invention, FIG. 2 is a view illustrating the configuration of a lean mechanism of the vehicle according to the embodiment of the present invention, and FIGS. 3A and 3B are back views each illustrating the configuration of vehicle according to the embodiment of the present invention. FIG. 3A is a view illustrating a state where a vehicle body is upright in posture, and FIG. 3B is a view illustrating a state where the vehicle body is inclined.

In the drawings, reference numeral 10 denotes a vehicle according to the embodiment. The vehicle 10 includes a main body part 20 as a vehicle body drive part, a boarding part 11 as a steering part on which an occupant boards and performs steering, a wheel 12F as a steerable steered wheel which is a front wheel provided at the width direction center in the vehicle body front side, and left and right wheels 12L and 12R as unsteerable wheels which are rear wheels provided at the vehicle body rear side.

The body part of the vehicle 10 other than the wheels, including the boarding part 11, to which the front wheel 12F, left wheel 12L, and right wheel 12R are mounted is defined as the vehicle body.

The vehicle 10 further includes, as a lean mechanism for inclining (leaning) the vehicle body to the left and right, i.e., a vehicle body inclining mechanism, a link mechanism 30 and a lean motor 25. The link mechanism 30 supports the left and right wheels 12L and 12R. The lean motor 25 is an inclination actuator that actuates the link mechanism 30.

The lean mechanism of the vehicle 10 is generically referred to as "inclining part" in the appended claims. Further, a term "steered wheel" in the appended claims corresponds to the wheel 12F in the present embodiment, and a term "pair of wheels provided in the vehicle width direction" in the appended claims corresponds to the left and right wheels 12L and 12R.

The vehicle 10 may be a three-wheeled vehicle having left and right front wheels and a single rear wheel or may be a four-wheeled vehicle having left and right front wheels and left and right rear wheels. In the present embodiment, as illustrated, a three-wheeled vehicle having a single front wheel and left and right rear wheels is taken as an example. Further, although the steered wheel may function as a drive wheel, the present embodiment assumes that the steered wheel does not function as a drive wheel. Further, the pair of wheels provided in the vehicle width direction may function as steered wheels.

In the vehicle 10 according to the present invention, basically, during turning operation, the angle of each of the left and right wheels 12L and 12R with respect to a road surface 18, i.e., the camber angle is changed, and the vehicle body including the boarding part 11 and main body part 20 is inclined to the turning inner wheel side, whereby turning performance can be improved, and riding comfort of the occupant can be ensured.

That is, the vehicle body of the vehicle 10 can be inclined laterally (in the left-right direction) as well. In the example illustrated in FIG. 2 and FIG. 3A, the left and right wheels 12L and 12R are upright with respect to the road surface 18 (camber angle is 0°). In the example illustrated in FIG. 3B, the left and right wheels 12L and 12R are inclined to the right with respect to the road surface 18 (camber angle is imparted).

The link mechanism 30 includes a left vertical link unit 33L, a right vertical link unit 33R, an upper lateral link unit 31U, a lower lateral link unit 31D, and a central vertical member 21. The left vertical link unit 33L supports the left wheel 12L and a left rotation drive device 51L having an electric motor that imparts drive force to the left wheel 12L. The right vertical link unit 33R supports the right wheel 12R and a right rotation drive device 51R having an electric motor that imparts drive force to the right wheel 12R. The upper lateral link unit 31U connects the upper ends of the left and right vertical link units 33L and 33R. The lower lateral link unit 31D connects the lower ends of the left and right vertical link units 33L and 33R. The central vertical member 21 extends vertically and is fixed to the main body part 20 at its upper end.

The left and right vertical link units 33L and 33R are rotatably connected to each other. The upper and lower lateral link units 31U and 31D are rotatably connected to each other and rotatably connected to the central vertical member 21 at their center portions. The left and right wheels 12L and 12R, left and right rotation drive devices 51L and 51R, left and right vertical link units 33L and 33R, and upper and lower lateral link units 31U and 31D are collectively referred to as "wheel 12", "rotation drive device 51", "vertical link unit 33", and "lateral link unit 31", respectively.

The rotation drive device 51 as a drive actuator is so-called an in-wheel motor having a body as a stator fixed to the vertical link unit 33 and a rotary shaft as a rotor rotatably fitted to the body and connected to the shaft of the wheel 12. The wheel 12 is rotated in connection with rotation of the rotation shaft. The rotation drive device 51 may be a motor of a type other than the in-wheel type.

The lean motor 25 is a rotary type electric actuator including an electric motor and has a cylindrical body as a stator and a rotary shaft as a rotor rotatably fitted to the body. The body is fixed to the main body part 20 through a mounting flange 22, and the rotary shaft is fixed to the upper lateral link unit 31U of the link mechanism 30.

The rotary shaft of the lean motor 25 functions as an inclination shaft for inclining the main body part 20 and is coaxial with a rotary shaft at a connection part between the central vertical member 21 and the upper lateral link unit 31U. When the lean motor 25 is driven so as to rotate its rotary shaft relative to the body, the upper lateral link unit 31U is turned relative to the main body part 20 and the central vertical member 21 fixed to the main body part 20, whereby the link mechanism 30 is actuated, i.e., bent and stretched. As a result, the main body part 20 can be inclined. The lean motor 25 may be used in such a manner that its rotation shaft is fixed to the main body part 20 and the central vertical member 21, and its body is fixed to the upper lateral link unit 31U.

The lean motor 25 has a lean angle sensor 125 for detecting a change in the lean angle made by the link mechanism 30. The lean angle sensor 125 is a rotation angle sensor for detecting the rotation angle of the rotary shaft relative to the body in the lean motor 25 and has, for example, a resolver, encoder, or the like. As described above, when the lean motor 25 is driven so as to rotate its rotation shaft relative to the body, the upper lateral link unit 31U is rotated relative to the main body part 20 and the central vertical member 21 fixed to the main body part 20. Therefore, a change in the angle of the upper lateral link unit 31U relative to the central vertical member 21 (i.e., change in the link angle) can be detected by detecting the rotation angle of the rotation shaft relative to the body.

The lean motor 25 includes an unillustrated lock mechanism for non-rotatably fixing the rotation shaft to the body. It is desired that the lock mechanism be a mechanical structure which does not consume electric power during a period during which it non-rotatably fixes the rotary shaft to the body. The rotary shaft can be non-rotatably fixed to the body, by the lock mechanism, at a predetermined angle relative to the body.

The boarding part 11 is connected to the front end of the main body part 20 through an unillustrated connection part. The connection part may have a function of connecting the boarding part 11 and the main body part 20 so that they can be moved relative to each other in a predetermined direction.

The boarding part 11 includes a seat 11a, a foot rest 11b, and a windshield 11c. The seat 11a is a portion where the occupant seats when he or she operates the vehicle 10 to travel. The foot rest 11b is a portion for supporting the feet of the occupant and is provided below the seat 11a on the front side (on the right side in FIG. 1) of the seat 11a.

An unillustrated battery device is disposed on the rear side or lower side of the boarding part 11 or within the main body part 20. The battery device is an energy supply source for the rotation drive device 51 and the lean motor 25. Further, an unillustrated controller, an unillustrated inverter, an unillustrated various sensors, etc. are accommodated on the rear side or lower side of the boarding part 11 or within the main body part 20.

A maneuvering device 41 is disposed on the front side of the seat 11a. Members necessary for maneuvering the vehicle 10, such as a steering wheel 41a as a steering device that the occupant operates to input steering instruction information such as a steering direction and a steering angle, meters such as a speed meter, indicators, and switches, are disposed on the maneuvering device 41.

The steering wheel 41a is generically referred to as "operation input part" in the appended claims.

The occupant instructs traveling conditions of the vehicle 10 (traveling direction, traveling speed, turning direction, turning radius, etc.) by operating the steering wheel 41a and other members. In place of the steering wheel 41a, a steering device of a different type, such as a steered wheel, a jog dial, a touch panel, or a push button, may be used.

The wheel 12F is connected to the boarding part 11 through a front wheel fork 17 which is a part of a suspension device. The suspension device is similar to a suspension device for a front wheel which is used in, for example, a common motorcycle, bicycle, or the like. For example, the front wheel fork 17 is a telescopic-type fork which includes a spring.

The vehicle 10 according to the present invention has two modes: a mode in which the wheel 12F as the steered wheel controls the steering angle according to the operation of the steering wheel 41a; and a mode in which the steering angle of the wheel 12F is made freely turnable irrespective of the operation of the steering wheel 41a. There is a predetermined trail $L_T$ between an intersection P between the steering axis (not illustrated) of the wheel 12F and the road surface and a grounding point O of the steered wheel. During turning in the latter mode, the wheel 12F in a freely turnable state is automatically steered following the camber angles of the respective left and right wheels 12L and 12R. Further, in the vehicle 10 according to the present embodiment, the intersection P between the steering axis of the wheel 12F and the road surface is positioned forward of the grounding point O of the steered wheel.

The turning of the wheel 12F does not refer to rotation of the wheel 12F itself when the vehicle 10 is travelling but to the behavior of the wheel 12F associated with the turning of the steering axis of the wheel 12F.

Figure 4:
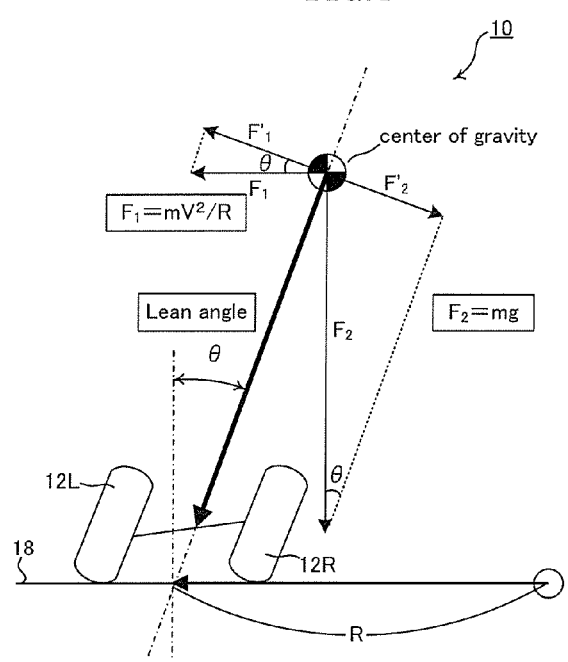
FIG. 4 is a schematic view illustrating the vehicle 10 according to the embodiment of the present invention.

The following describes the mode in which the vehicle 10 travels with the wheel 12F being in a freely turnable state. FIG. 4 is a schematic view of the vehicle 10 according to the embodiment of the present invention. FIG. 4 illustrates a state where camber angles are imparted to the respective left and right wheels 12L and 12R and the vehicle 10 is turned under lean control. Assuming that the weight of the vehicle 10 is m, gravitational acceleration is g, lean angle under the lean control of the vehicle 10 is θ, speed of the vehicle 10 during turning is V, and turning radius is R, $F_1$ and $F_2$ can be represented by the following equations (1) and (2).

[Numeral 1]
$$F_1 = \frac{mV^2}{R} \tag{1}$$

[Numeral 2]
$$F_2 = mg \tag{2}$$

The following equations (3) and (4) are satisfied by a geometric relationship.

[Numeral 3]
$$F_1' = F_1 \cos\theta \tag{3}$$

[Numeral 4]
$$F_2' = F_2 \cos\theta \tag{4}$$

The following equation (5) is satisfied when the vehicle 10 is turned under the conditions described above.

[Numeral 5]
$$F_1' = F_2' \tag{5}$$

When the equations (1) to (4) are assigned to the equation (5) and arranged, the vehicle turning radius R can be calculated by the following equation (6).

[Numeral 6]
$$R = \frac{V^2}{g\tan\theta} \tag{6}$$

The above expression (6) indicates that when the vehicle speed V during turning and the lean angle θ of the vehicle 10 are determined, the traveling direction of the vehicle 10 can be determined.

Returning back to the description of the steering wheel 41a, the steering wheel 41a is connected to the upper end of an unillustrated steering shaft member, and the upper end of the steering shaft member is rotatably mounted to an unillustrated frame member of the boarding part 11 in an inclined state so as to be located rearward of the lower end thereof.

The rotation angle of the upper end of the steering shaft member with respect to frame member, i.e., a steering wheel angle as a steering angle command value input by the occupant operating the steering wheel 41a is detected by a steering wheel operation angle sensor 123 as an input steering angle detection means. The steering wheel operation angle sensor 123 is, e.g., an encoder.

Further, a steering motor 65 as a steering actuator device is provided between the upper and lower ends of the steering shaft member. In the mode in which the steering angle is controlled according to the operation of the steering wheel 41a with the wheel 12F used as the steered wheel, the steering motor 65 rotates the lower end of the steering shaft member according to the steering angle detected by the steering wheel operation angle sensor 123. The lower end of the steering shaft member is rotatably mounted to the frame member and connected to the upper end of the front wheel fork 17.

The rotation angle of the lower end of the steering shaft member with respect to the frame member, i.e., the steering angle output from the steering motor 65 and transmitted to the wheel 12F through the front wheel fork 17 is detected by a front wheel steering angle sensor 124 as an output steering angle detection means. The front wheel steering angle sensor 124 is, for example, a rotation angle sensor provided in the steering motor 65 and detecting the rotation angle of a rotation axis with respect to the body. The front wheel steering angle sensor 124 is, e.g., a resolver or an encoder. The distance between the axle of the front wheel 12F and the axles of the left and right rear wheels 12L and 12R; i.e., the wheelbase is represented by $L_H$.

In the mode in which the steering angle of the wheel 12F is made freely turnable irrespective of the operation of the steering wheel 41a, the steering angle of the wheel 12F is made freely turnable by stopping the control of the steering motor 65. Alternatively, to make the steering angle of the wheel 12F freely turnable, the steering motor 65 may be controlled to zero torque, or the steering motor 65 and steering shaft member may be separated by a clutch or the like.

The vehicle 10 further includes an accelerator 45, which is a drive command device that inputs a drive force generation command, as a part of the maneuvering device 41. The accelerator 45 is a device that inputs a drive force generation command to the rotation drive device 51. The vehicle 10 further includes a brake 46. When the occupant steps the brake 46, braking force is applied to the vehicle 10.

A shift switch 47 is a switch for the occupant to select a traveling mode of the vehicle 10. In the present embodiment, the vehicle 10 has at least the following four traveling modes: a drive range; a neutral range; a reverse range; and a parking range. These traveling modes are similar to those of an automobile provided with a common automatic transmission.

Further, a vehicle speed sensor 122, which serves as a vehicle speed detection means for detecting the vehicle speed (traveling speed) of the vehicle 10, is provided at the lower end of the front wheel fork 17 supporting the axle of the wheel 12F. The vehicle speed sensor 122 is a sensor for detecting the vehicle speed from the rotation speed of the wheel 12F and is, e.g., an encoder.

Figure 5:
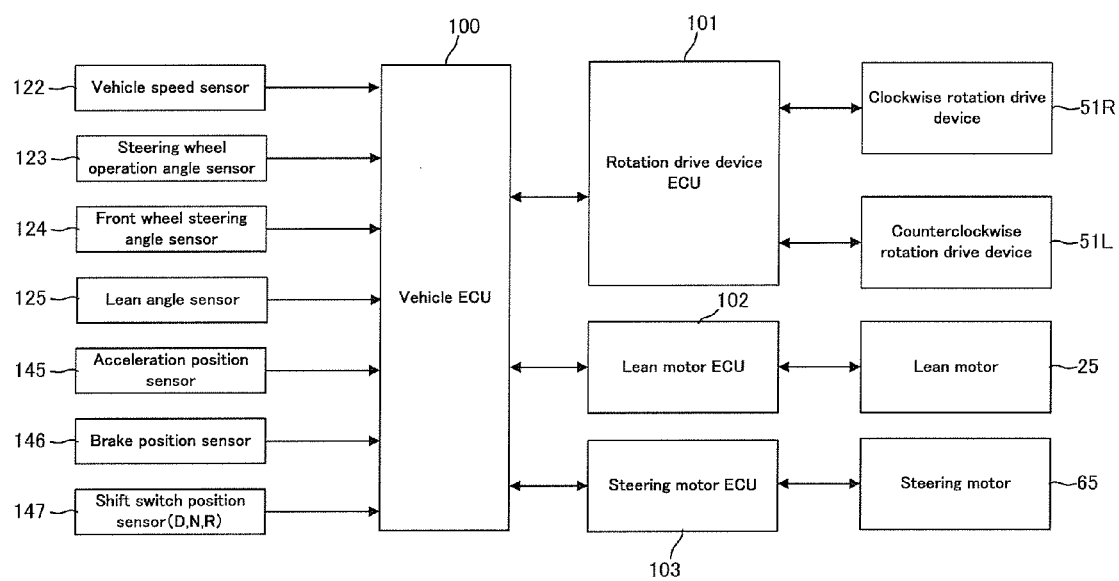
FIG. 5 is a block diagram illustrating the system configuration of the vehicle 10 according to the embodiment of the present invention.

The following describes the system of the vehicle 10 according to the present invention. FIG. 5 is a block diagram illustrating the system configuration of the vehicle 10 according to the embodiment of the present invention. In FIG. 5, an ECU is the abbreviation of Electronic Control Unit. The ECU is a general purpose information processing mechanism constituted of a CPU, a ROM storing a program operating on the CPU, and a RAM serving as a work area for the CPU.

A vehicle ECU 100 cooperates with the illustrated components connected thereto. Various kinds of control processing performed in the vehicle 10 according to the present invention are executed on the basis of the program and data stored in storing means, such as the ROM provided in the vehicle ECU 100.

The vehicle 10 according to the present invention further includes a rotation drive device ECU 101 that controls the rotation drive device 51R and rotation drive device 51L on the basis of command values output from the vehicle ECU 100, a lean motor ECU 102 that controls the lean motor 25 on the basis of command values output from the vehicle ECU 100, and a steering motor ECU 103 that controls the steering motor 65 on the basis of command values output from the vehicle ECU 100.

The "steered wheel controller" and the like described in the appended claims are each generic expression of the control operation performed by each of the above ECUs.

The vehicle speed sensor 122 detects the vehicle speed of the vehicle 10, and vehicle speed data detected by the vehicle speed sensor 122 is input to the vehicle ECU 100.

The steering wheel operation angle sensor 123 detects the steering wheel angle of the steering wheel 41*a*, and steering wheel angle data of the steering wheel 41*a* detected by the steering wheel operation angle sensor 123 is input to the vehicle ECU 100.

The front wheel steering angle sensor 124 detects the steering angle of the front wheel 12F, and steering angle data of the wheel 12F detected by the front wheel steering angle sensor 124 is input to the vehicle ECU 100.

The lean angle sensor 125 detects the inclination amount of the vehicle 10, and inclination amount data of the vehicle 10 detected by the lean angle sensor 125 is input to the vehicle ECU 100.

An acceleration position sensor 145 detects the depressed amount of the accelerator 45 by the occupant, and depressed amount data of the accelerator 45 detected by the acceleration position sensor 145 is input to the vehicle ECU 100.

A brake position sensor 146 detects the depressed amount of the brake 46 by the occupant, and depressed amount data of the brake 46 detected by the brake position sensor 146 is input to the vehicle ECU 100.

A shift switch position sensor 147 detects at which one of the positions corresponding to the drive range, neutral range, and reverse range the shift switch 47 is positioned, and position detected by the shift switch position sensor 147 is input to the vehicle ECU 100.

The above data thus input to the vehicle ECU 100 are used for control of the rotation drive device 51R, rotation drive device 51L, lean motor 25, and steering motor ECU 103.

The following describes the traveling modes of the thus configured vehicle 10. In the vehicle 10 according to the present invention, the wheel 12F as the steering wheel is aggressively steered during a low-speed operation in order to enhance traveling stability, while during a high-speed operation, the steering angle of the steered wheel is made freely turnable so as to follow the lean control of the wheels 12L and 12R. The lean control of the wheels 12L and 12R is performed as needed during both high- and low-speed operations. Hereinafter, the traveling mode during the low-speed operation of the vehicle 10 is referred to as "first mode", and that during the high-speed operation is referred to as "second mode".

Figure 6:
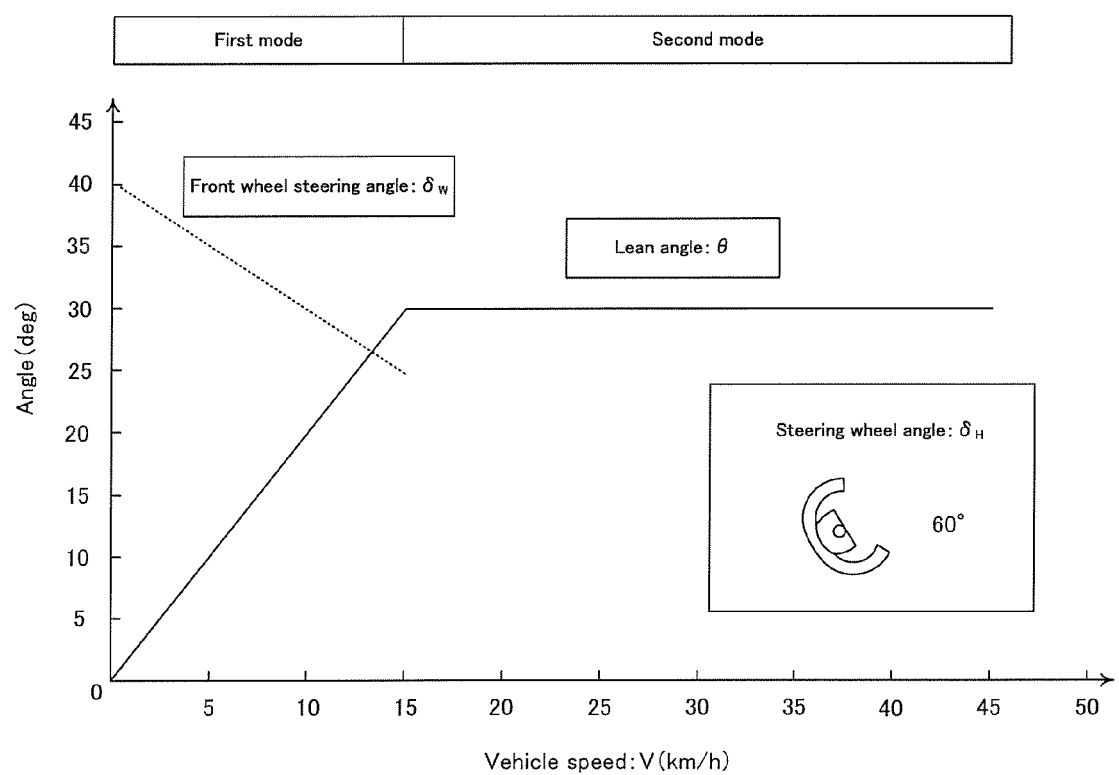
FIG. 6 is a view conceptually explaining the traveling state of the vehicle 10 according to the embodiment of the present invention.

FIG. 6 is a view conceptually explaining the traveling state of the vehicle 10 according to the embodiment of the present invention. In FIG. 6, it is assumed that the steering wheel angle of the steering wheel 41*a* is set to 60° to the right and the vehicle speed is increased from 0 km/h. Hereinafter, the vehicle speed at the boundary for switching between the first and second modes is set to 15 km/h, but the boundary value is not limited thereto.

In the present embodiment, switching between the first and second modes is made based on the vehicle speed of the vehicle 10 detected by the vehicle speed sensor 122. Alternatively, however, the switching may be made based on any parameter other than the vehicle speed detected by the vehicle speed sensor 122 as long as the first and second modes are set during the low-speed operation and during the high-speed operation, respectively.

Further, in the present embodiment, the relationship between a front wheel steering angle $\delta_W$ ($\delta_W 1$ is the initial steering angle of the wheel 12F (front wheel)) and a steering wheel angle $\delta_H$ and the relationship between a lean angle $\theta$ and the steering wheel angle $\delta_H$ are represented by the following equations (7) and (8).

[Numeral 7]

$$\delta_W 1 = \delta_H / k_2 \tag{7}$$

[Numeral 8]

$$\theta = \delta_H / k_1 \tag{8}$$

In the above equations (7) and (8), $k_1$ and $k_2$ are constants and set to 60/30 and 60/40, respectively, but not limited thereto. $K_1$ is an imaginary lean gear ratio, and $K_2$ is like an imaginary steering gear ratio. Any numerical value can be set for the $K_1$ and $K_2$ as long as it contributes to ease of driving operation of the vehicle 10.

Further, in FIG. 6, the dashed line denotes the steering angle $\delta_W$ of the wheel 12F, and the continuous line denotes the lean angle $\theta$ of the vehicle 10.

When the vehicle speed is increased from 0 km/h with the steering wheel angle $\delta_H$ set to 60°, the vehicle 10 starts traveling in the first mode. At the start-up speed from 0 km/h, the wheel 12F as the steered wheel is steered at 40°, and the steering angle is gradually reduced. On the other hand, the lean angle θ of the vehicle 10 is gradually increased from 0. The steered wheel 12F and the lean angle θ of the vehicle 10 are gradually reduced and gradually increased, respectively, according to a linear function, but not limited thereto. Further, the lean angle θ of the vehicle 10 may remain at 0 until the vehicle speed becomes a predetermined speed (e.g., 3 km/h) and may then be gradually increased. The term "gradual increase" in the appended claims includes the content of the present embodiment that the lean angle θ may remain at 0 until the vehicle speed becomes a predetermined speed (e.g., 3 km/h).

The first mode is switched to the second mode at 15 km/h which is the boundary value. In the second mode after the switching timing, the steering angle of the wheel 12F as the steered wheel is made freely turnable, and the lean angle θ is set to 30° as specified by the equation (8). Afterward, even when the vehicle speed V is further increased, turning of the vehicle 10 is controlled only by the lean angle θ in the second mode corresponding to the high-speed operation, and the steering angle of the wheel 12F is made freely turnable so as to follow turning control based on the lean angle θ.

The speed of the vehicle 10 serving as the boundary value for switching from the first mode to the second mode, or the speed of the vehicle 10 serving as the boundary value for switching from the second mode to the first mode is referred to as "predetermined speed" in the appended claims.

Figure 7:
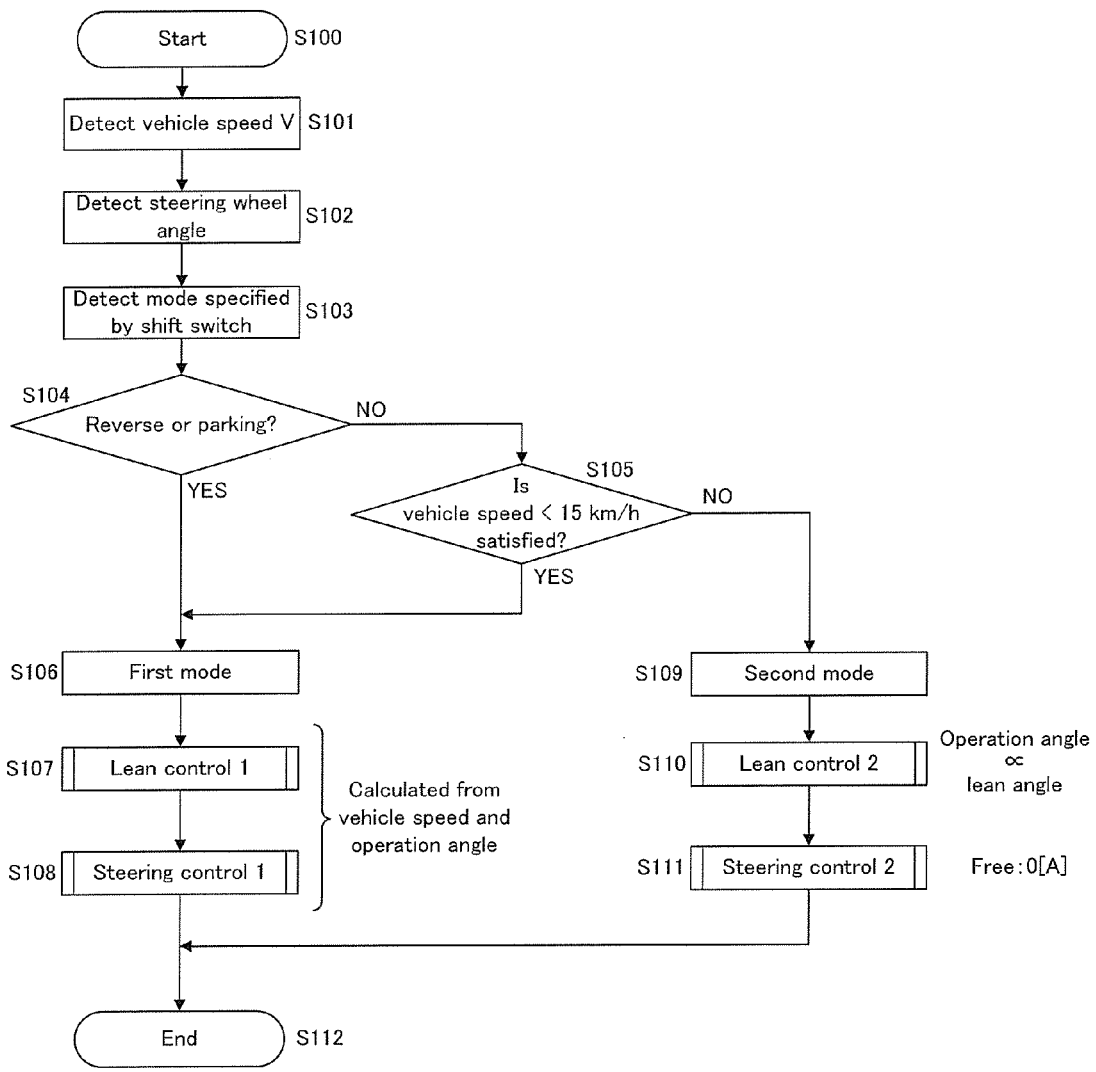
FIG. 7 is a view illustrating a control flowchart of the vehicle 10 according to the embodiment of the present invention.

The following more specifically describes control of the vehicle 10 based on the above-described first and second modes. FIG. 7 is a view illustrating a control flowchart of the vehicle 10 according to the embodiment of the present invention.

In FIG. 7, control processing is started in step S100. Subsequently, the vehicle speed V is detected in step S101, and the steering wheel angle $\delta_H$ of the steering wheel 41a is detected in step S102. Then, in step S103, a mode specified by the shift switch 47 is detected by the shift switch position sensor 147.

In step S104, whether any one of the reverse and parking has been specified by the shift switch 47 is determined.

When the determination in step S104 is YES, the flow advances to step 106; on the other hand, when the determination is NO, the flow advances to step 105.

In step S105, whether "vehicle speed V<15 km/h" is satisfied or not is determined. When the determination in step S105 is YES (that is, when the vehicle 10 travels at a lower speed than 15 km/h), the flow advances to step 106; on the other hand, when the determination is NO (that is, when the vehicle 10 travels at a speed equal to or higher than 15 km/h), the flow advances to step 109.

In step S106, the vehicle 10 is determined to be in the first mode. Then, lean control 1 of the wheels 12R and 12L based on the first mode is performed in step S107, and steering control 1 of the wheel 12F based on the first mode is performed in step S108.

In step S109, the vehicle 10 is determined to be in the second mode. Then, lean control 2 of the wheels 12R and 12L based on the second mode is performed in step S110, and steering control 2 of the wheel 12F based on the second mode is performed in step S111.

The control processing is ended in step S112.

The lean control of the wheels 12R and 12L and steering control of the wheel 12F based on the first and second modes will be described below in an exemplified manner. In the following example, a case where the vehicle speed V of the vehicle 10 is changed from V1 (initial vehicle speed) to V2 (vehicle speed at mode switching) will be described. Further, in this example, V1 and V2 are set to 0 km/h and 15 km/h, respectively, but not limited thereto.

Figure 8:
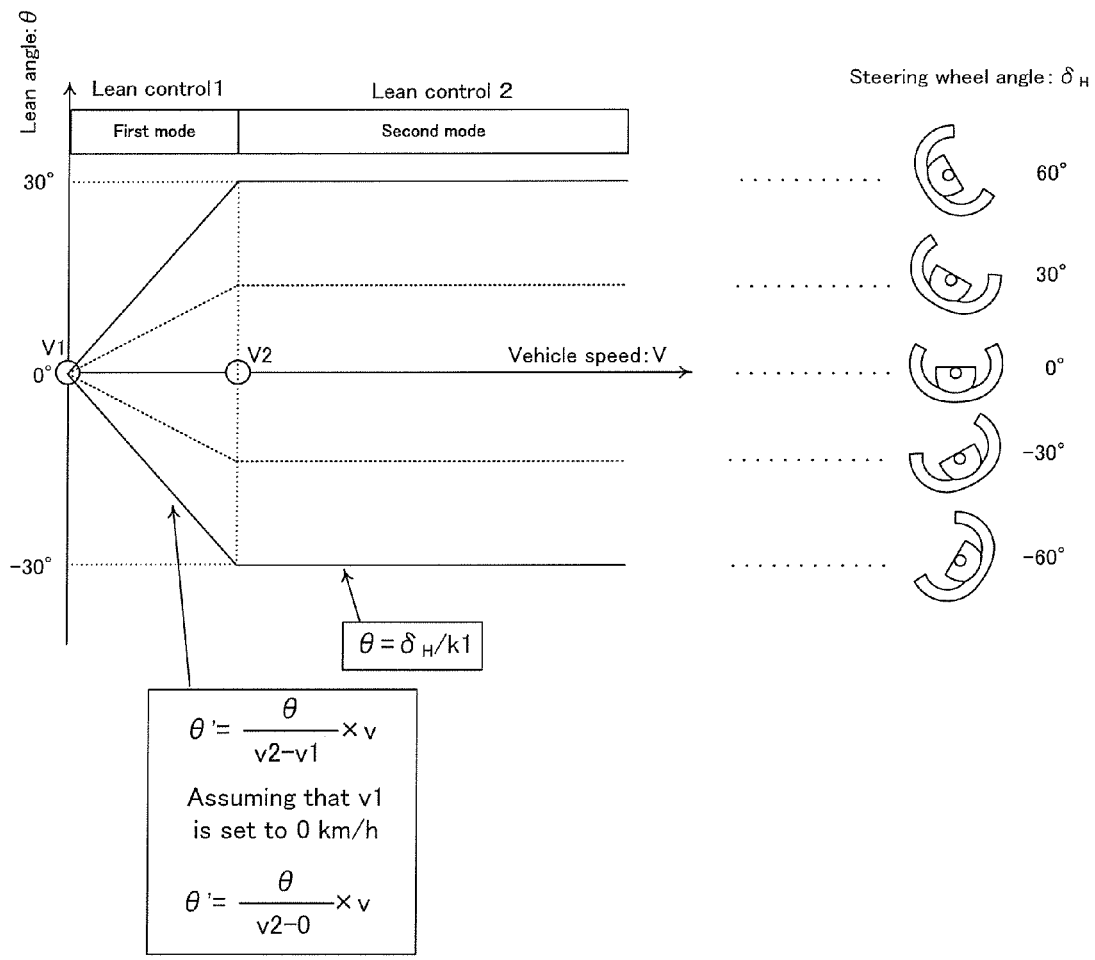
FIG. 8 is a view for explaining an example of the lean control of the vehicle 10 according to the embodiment of the present invention.

FIG. 8 is a view for explaining an example of the lean control of the vehicle 10 according to the embodiment of the present invention. Hereinafter, the lean angle θ of the vehicle 10 according to the present embodiment is determined according to the vehicle steering wheel angle $\delta_H$. In each of FIGS. 8, 9, 10, and 12, the steering wheel angles of the steering wheel 41a are illustrated on the right side, and the relationship between their corresponding vehicle speed and angles (lean angle θ and steering angle $\delta_W$) is graphically illustrated.

In the second mode (i.e., the case where the vehicle speed is equal to or higher than V2) illustrated in FIG. 8, the lean angle θ is determined by the above-described equation (8).

Then, based on the thus determined lean angle θ, a lean angle θ' in the first mode is calculated according to the following equation (9).

[Numeral 9]

$$\theta' = \frac{\theta}{v2 - v1} \times v_1 \qquad (9)$$

As described above, in the lean control of the wheels 12R and 12L, the lean angle θ is increased according to a linear function until the vehicle speed becomes V2 and is made constant at a vehicle speed higher than V2. In the lean control of the vehicle 10 according to the present embodiment, the lean angle θ is calculated from the steering wheel angle $\delta_H$ according to the equation (8) or equation (9). Although the equation (9) is defined by a linear function of the vehicle speed V, it may be defined by any function as long as it is a gradually increasing function.

Figure 9:
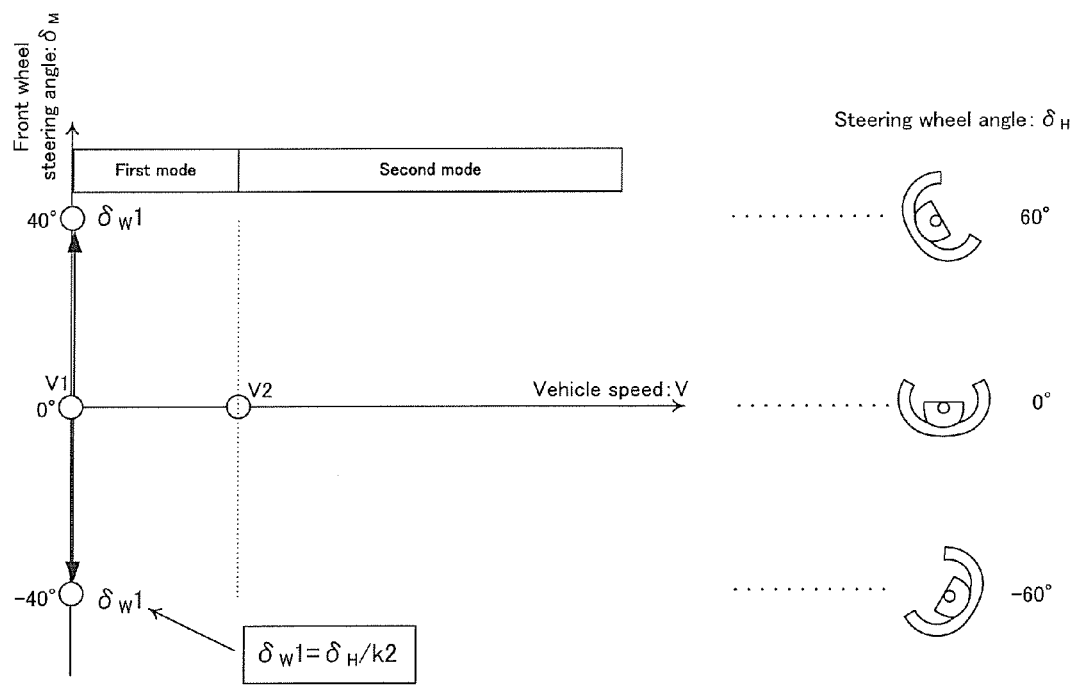
FIG. 9 is a conceptual view illustrating an example where an initial steering angle of the front wheel of the vehicle 10 according to the embodiment of the present invention is determined.
Figure 10:
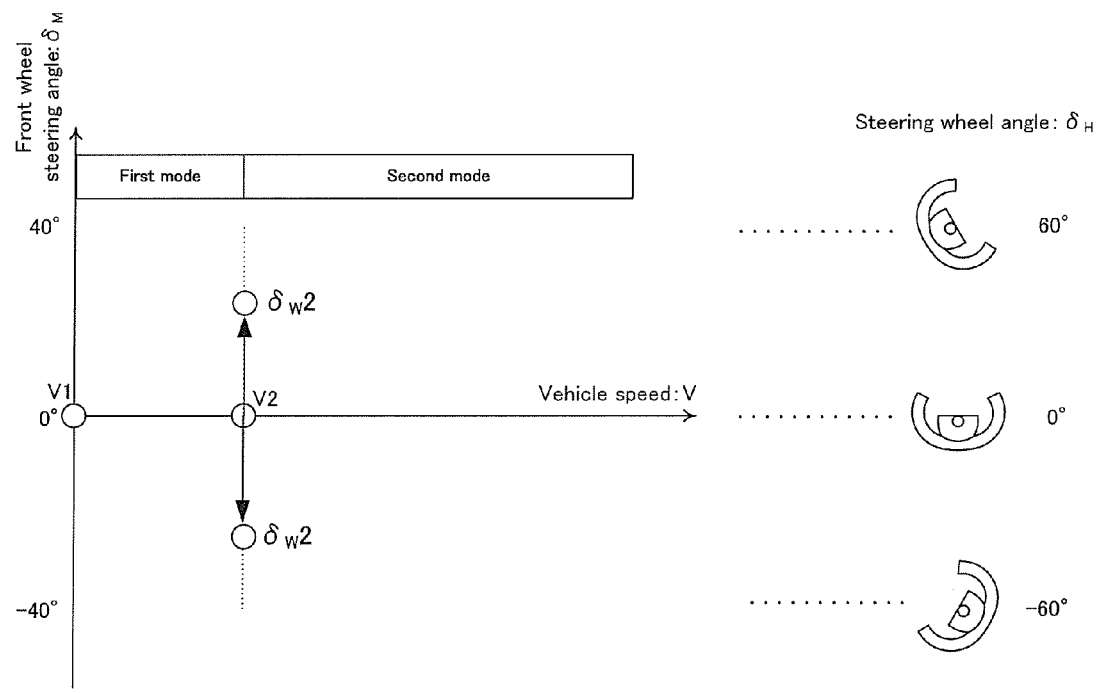
FIG. 10 is a conceptual view illustrating an example where a target steering angle of the front wheel of the vehicle 10 according to the embodiment of the present invention at mode switching is determined.

The following describes steering control of the front wheel 12F in the first and second modes. FIG. 9 is a conceptual view illustrating an example where the initial steering angle (at a vehicle speed of V1) of the front wheel of the vehicle 10 according to the embodiment of the present invention is determined. FIG. 10 is a conceptual view illustrating an example where a target steering angle (at a vehicle speed of V2) of the front wheel of the vehicle 10 according to the embodiment of the present invention at mode switching is determined.

It is assumed hereinafter that the initial steering angle of the wheel 12F is set to $\delta_W 1$, and the target steering angle of the wheel 12F at mode switching is set to $\delta_W 2$.

The initial steering angle $\delta_W 1$ of the wheel 12F at the vehicle speed V1 is calculated from the steering wheel angle $\delta_H$ according to the equation (7). On the other hand, the target steering angle $\delta_W 2$ of the wheel 12F at a vehicle speed of V2 is controlled so as to follow the lean angle θ at a timing when the steering angle of the wheel 12F is made freely turnable.

Figure 11:
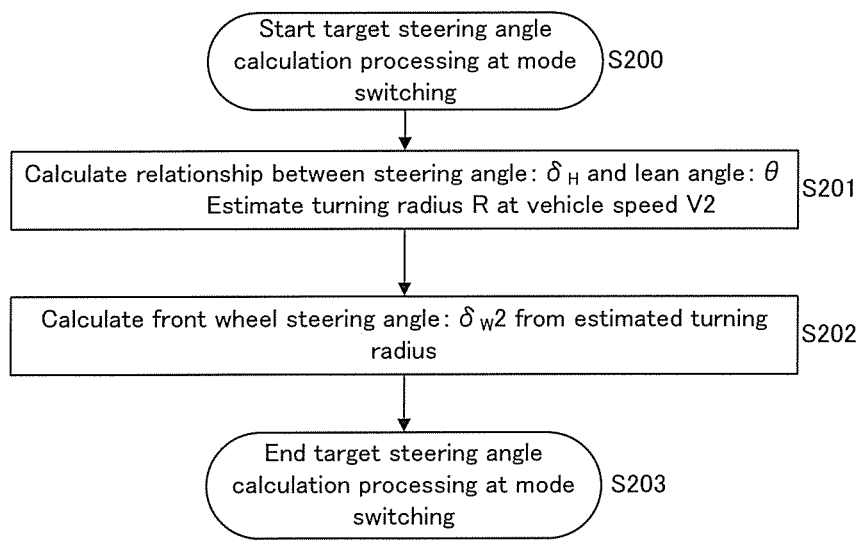
FIG. 11 is a view illustrating a flowchart of calculation processing for calculating the target steering angle of the front wheel of the vehicle 10 according to the embodiment of the present invention at mode switching.

A calculation method for the target steering angle $\delta_W 2$ at mode switching will be described with reference to FIG. 11. FIG. 11 is a view illustrating a flowchart of calculation processing for calculating the target steering angle of the front wheel of the vehicle 10 according to the embodiment of the present invention at mode switching.

The target steering angle calculation processing at mode switching is started in step S200 of FIG. 11. Subsequently, in step S201, the relationship between the steering wheel angle $\delta_H$ and lean angle $\theta$ is calculated from the equation (8), and the turning radius R at the vehicle speed V2 is calculated. The radius R can be expressed as the following equation (10) by using the equation (6).

[Numeral 10]

$$R = \frac{V2^2}{g\tan\theta} = \frac{V2^2}{g\tan(\delta_H/k1)} \quad (10)$$

Figure 13:
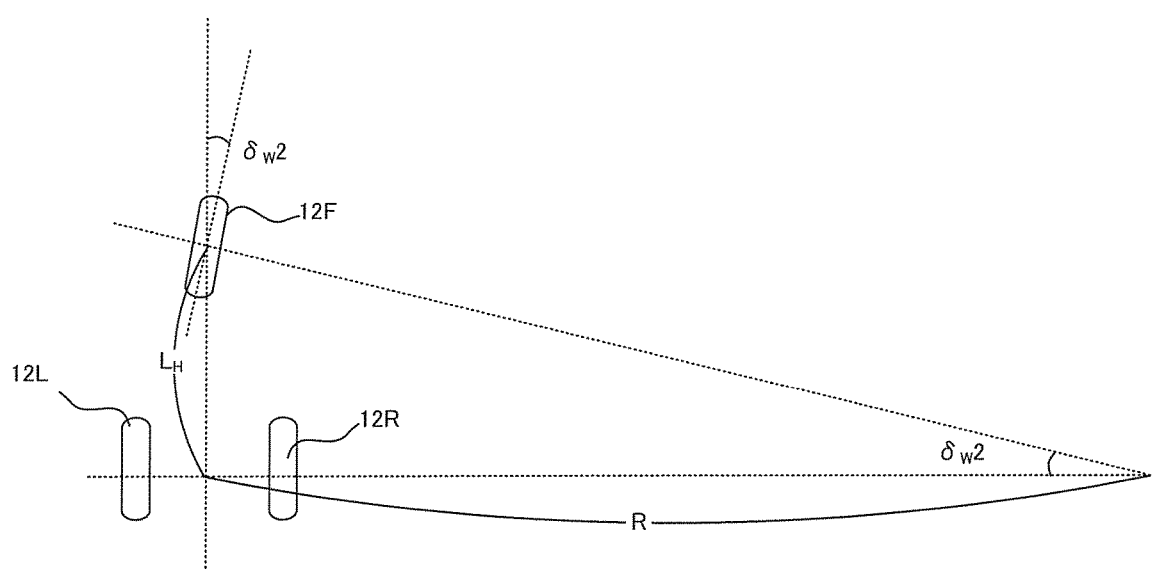
FIG. 13 is a view illustrating the relationship among the wheels of the vehicle 10 during turning at the steering angle $\delta_W 2$.

In step S202, the target steering angle $\delta_W 2$ of the front wheel (wheel 12F) is calculated from the estimated turning radius. FIG. 13 is a view illustrating the relationship among the wheels of the vehicle 10 during turning at the steering angle $\delta_W 2$. The target steering angle $\delta_W 2$ can be calculated from the relationship among the target steering angle $\delta_W 2$, turning radius R, and wheel base $L_H$ according to the following equation (11).

[Numeral 11]

$$\delta_W 2 = \arctan\frac{L_H}{R} = \frac{L_H}{\frac{V2^2}{g\tan(\delta_H/k1)}} \quad (11)$$

In step S203, the target steering angle calculation processing at mode switching is ended.

Figure 12:
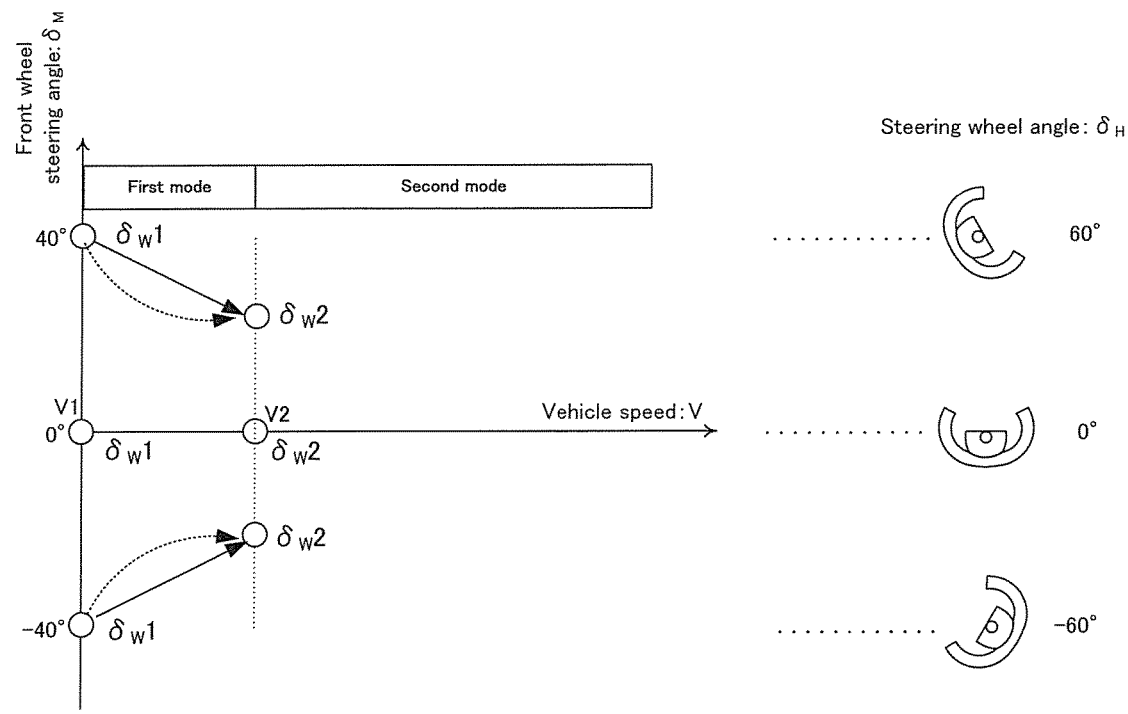
FIG. 12 is a view illustrating a transition from the initial steering angle of the front wheel of the vehicle 10 according to the embodiment of the present invention to the target steering angle.

The wheel 12F is steered until the target steering angle at mode switching thus calculated is reached. FIG. 12 is a view illustrating a transition from the initial steering angle $\delta_W 1$ of the front wheel of the vehicle 10 according to the embodiment of the present invention to the target steering angle $\delta_W 2$.

The transition from the initial steering angle $\delta_W 1$ to the target steering angle $\delta_W 2$ may be made as not only in the manner denoted by the continuous line of FIG. 12, but also in the manner as denoted by the dotted line.

In a state where the vehicle speed is higher than V2, the steering angle of the wheel 12F is made freely turnable.

Thus, in the vehicle 10 according to the present invention, when the vehicle speed is lower than a predetermined vehicle speed, the vehicle 10 travels in the first mode in which the steered wheel controller controls the steering angle of the steered wheel (12F) according to an input from the operation input part (steering wheel 41a), and the inclining part (lean mechanism) inclines the vehicle body according to an input from the operation input part (steering wheel 41a); on the other hand, when the vehicle speed is equal to or higher than the predetermined vehicle speed, the vehicle 10 travels in the second mode in which the steered wheel controller makes the steered wheel (12F) freely turnable irrespective of the operation input part (steering wheel 41a), and the inclining part (lean mechanism) inclines the vehicle body according to an input from the operation input part (steering wheel 41a). Thus, traveling stability can be ensured over the entire vehicle speed range.

Further, in the vehicle 10 according to the present invention, in the first mode, the inclination angle of the vehicle body is gradually increased along with an increase in the vehicle speed to be the inclination angle of the vehicle body at the predetermined vehicle speed in the second mode.

Thus, transition between the first and second modes can be achieved without giving a sense of incompatibility to the occupant of the vehicle 10.

Further, in the vehicle 10 according to the present invention, the turning radius based on the inclination angle of the vehicle body at the predetermined vehicle speed in the second mode is estimated, then the steering angle of the steered wheel (12F) at the predetermined vehicle speed is calculated from the estimated turning radius, and the steered wheel (12F) is steered until the calculated steering angle is reached. Thus, transition between the first and second modes can be achieved without giving a sense of incompatibility to the occupant of the vehicle 10.

Further, in the vehicle 10 according to the present invention, the operation input part (steering wheel 41a) detects an input steering angle which is an angle to be steered, and the inclining part (lean mechanism) inclines the vehicle body at a constant imaginary gear ratio with respect to the input steering angle in the second mode, whereby steering matching with the intention of the occupant of the vehicle 10 can be achieved.

Further, in the vehicle 10 according to the present invention, the front wheel serves as the steered wheel (12F), so that, in the second mode, the front wheel as the steered wheel is turned more adequately to follow the turning based on the lean angle $\theta$.

Further, in the vehicle 10 according to the present invention, the inclining part (lean mechanism) inclines the pair of wheels (12R and 12L) to incline the vehicle body. This allows the camber thrust of the pair of wheels (12R and 12L) to be utilized, whereby the vehicle 10 can be turned adequately.

Further, in the vehicle 10 according to the present invention, the vehicle travels in the first mode when being moved back, so that even at the time of backward traveling, the vehicle 10 can travel stably.

The above describes switching from the first mode to the second mode in the vehicle 10 according to the present invention. Next, switching from the second mode to the first mode will be described.

As described above, after transition from the first mode to the second mode, the wheel 12F is made freely turnable irrespective of the steering wheel 41a and is thus steered following external force, so as to be turned smoothly. On the other hand, at transition from the second mode to the first mode, the steering motor 65 forcibly controls the steering angle of the wheel 12F according to an input from the steering wheel 41a, which disadvantageously gives a sense of incompatibility to the occupant.

Figure 14:
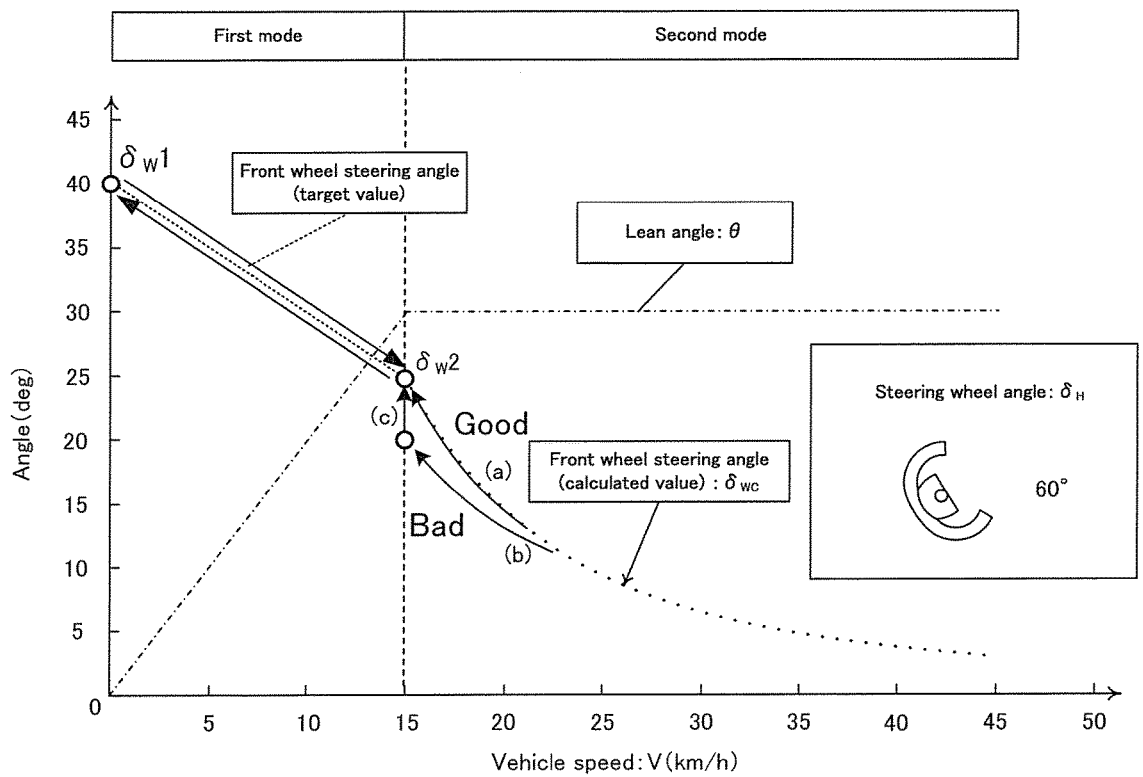
FIG. 14 is a view for explaining a problem at switching from the second mode to the first mode.

FIG. 14 is a view for explaining the problem at switching from the second mode to the first mode. The steering wheel angle of the steering wheel 41a is set to 60° to the right, and the vehicle speed of the vehicle 10 is increased from the vehicle speed V1 (initial vehicle speed=0 km/h) to V2 (predetermined vehicle speed at mode switching) to achieve the mode switching. Then, after the vehicle 10 travels for a predetermined period of time in the second mode, the vehicle speed is reduced to equal to or less than V2, with the result that the second mode is switched to the first mode, and the vehicle speed is returned to V1 again. FIG. 14 illustrates the relationship among the vehicle speed of the vehicle 10, steering angle $\delta_W$ of the wheel 12F, and lean angle $\theta$ of the vehicle 10 in the above-mentioned state.

In the following FIGS. 14 to 17, the lean angle $\theta$ of the vehicle 10 is denoted by the dashed dotted line. Further, in each of FIGS. 14 to 17, the dotted line in the first mode region denotes a target value of the steering angle $\delta W$ of the wheel 12F, and the dotted line in the second mode region denotes a calculated value of the steering angle $\delta_W$ of the wheel 12F. FIGS. 14 to 17 each illustrate an example of a traveling pattern of the vehicle 10, and the present invention is not limited to these traveling patterns.

In FIG. 14, at switching from the first mode to the second mode, the target steering angle of the wheel 12F is set to $\delta_W 2$, so that the steering angle of the wheel 12F is controlled to be $\delta_W 2$ at the moment when the vehicle speed becomes V2, and simultaneously with the switching timing, the steering angle of the wheel 12F is made freely turnable irrespective of the steering wheel 41a.

Afterward, in the traveling of the vehicle 10 in the second mode, the steering angle of the wheel 12F is freely turnable, and the vehicle 10 travels under the control of only the lean angle θ of the vehicle 10. Here, a case where the vehicle 10 traveling in the second mode decelerates and switching from the second mode to the first mode is made will be considered.

It is ideal that the steering angle of the wheel 12F in a freely turnable state exhibits the behavior of a locus denoted by (a) of FIG. 14 and that the steering angle of the wheel 12F becomes $\delta_W 2$ at the moment when the second mode is switched to the first mode. However, there may be a case where the steering angle of the wheel 12F in a freely turnable state exhibits the behavior of a locus denoted by (b) of FIG. 14 and that the steering angle of the wheel 12F deviates from $\delta_W 2$ at the moment when the second mode is switched to the first mode. In such a case, the steering angle of the wheel 12F is forcibly controlled to be $\delta_W 2$ by the steering motor 65 according to an input (in this example, the steering wheel angle is 60°) from the steering wheel 41a at the moment when the second mode is switched to the first mode, which disadvantageously gives a sense of incompatibility to the occupant.

Figure 15:
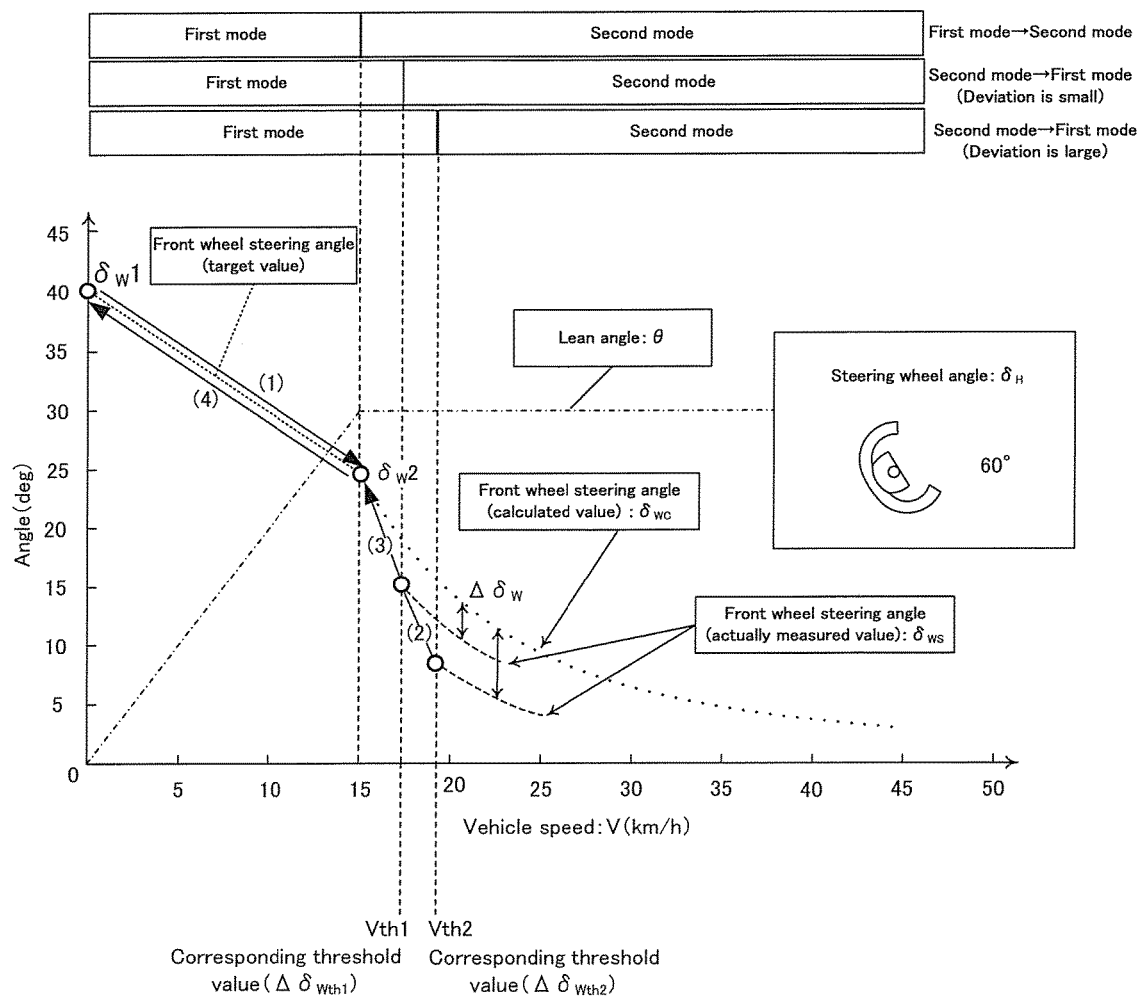
FIG. 15 is a view for explaining switching from the second mode to the first mode in the vehicle 10 according to a first embodiment of the present invention.

The following describes a means for solving the problem occurring when the second mode is switched to the first mode. FIG. 15 is a view for explaining switching from the second mode to the first mode in the vehicle 10 according to a first embodiment of the present invention.

In FIG. 15, the steering angle of the steering wheel 41a is assumed to be 60°.

(1) of FIG. 15 denotes the time period during which the vehicle speed of the vehicle 10 is increased from V1 to V2. At the moment when the vehicle speed becomes V2, the steering angle of the wheel 12F becomes $\delta_W 2$ and, at the same time, the first mode is switched to the second mode, whereby the wheel 12F is made freely turnable irrespective of the steering wheel 41a.

The following describes control of the vehicle 10 according to the present embodiment, taking a case where the first mode is switched to the second mode, then the vehicle 10 travels for a predetermined period of time in the second mode, and the vehicle speed is reduced to equal to or less than V2. (4) of FIG. 15 denotes the time period during which the vehicle speed of the vehicle 10 is reduced from V2 to V1 after the second mode is switched to the first mode.

The steering angle of the wheel 12F detected by the front wheel steering angle sensor 124 is assumed to be $\delta_{WS}$. $\delta_{WC}$ is a calculated value of the steering angle of the wheel 12F. In the present embodiment, a difference $\Delta\delta_W$ between the two steering angles is calculated from $\Delta\delta_W = \delta_{WC} - \delta_{WS}$, and the predetermined vehicle speed at which the second mode is switched to the first mode is changed according to the value of the $\Delta\delta_W$.

That is, in the present embodiment, the predetermined speed at switching from the first mode to the second mode and the predetermined speed at switching from the second mode to the first mode differ from each other. Further, the predetermined speed at switching from the second mode to the first mode is set higher than the predetermined speed at switching from the first mode to the second mode. The details will be described below.

How the mode is determined to be switched based on the steering angle difference $\Delta\delta_W$ will be described with reference to FIG. 15. Here, illustrated Vht1 and Vht2 are introduced as determination vehicle speeds which are higher than and close to V2. The two determination vehicle speeds are assumed to have the relationship of Vht1<Vht2. Although two determination vehicle speeds are introduced in this example, the number of the determination vehicle speeds to be introduced is optionally determined.

Further, thresholds $\Delta\delta_{Wth1}$ and $\Delta\delta_{Wth2}$ for determination are introduced with respect to the two determination vehicle speeds Vth1 and Vth2. The two thresholds are assumed to have the relationship of $\Delta\delta_{Wth1} < \Delta\delta_{Wth2}$.

In the second mode, when the vehicle speed of vehicle 10 is reduced to the determination vehicle speed Vht2, the steering angle difference $\Delta\delta_W$ and the threshold $\Delta\delta_{Wth2}$ are compared. When the difference $\Delta\delta_W$ is smaller than $\Delta\delta_{Wth2}$, the vehicle 10 continues traveling in the second mode.

On the other hand, when the difference M is equal to or larger than $\Delta\delta_{Wth2}$, the second mode is switched to the first mode, and the steering angle of the wheel 12F is controlled by the steering motor 65 according to the operation of the steering wheel 41a. In the first mode starting at the determination vehicle speed Vht2, the steering angle of the wheel 12F is controlled so as to follow the locus denoted by (2) and (3) of FIG. 15 and to be $\delta_W 2$ at the moment when the vehicle speed becomes V2.

When the second mode is not switched to the first mode at the vehicle speed Vht2, and the vehicle speed of the vehicle 10 is reduced to the determination vehicle speed Vht1, the steering angle difference $\Delta\delta_W$ and the threshold $\Delta\delta_{Wth1}$ are compared for determination at the Vht1. When the difference $\Delta\delta_W$ is smaller than the threshold $\Delta\delta_{Wth1}$, the vehicle 10 continues traveling in the second mode, and the second mode is switched to the first mode at V2.

On the other hand, when the difference $\Delta\delta_W$ is equal to or larger than the threshold $\Delta\delta_{Wth1}$, the second mode is switched to the first mode, and the steering angle of the wheel 12F is controlled by the steering motor 65 according to the operation of the steering wheel 41a. In the first mode starting at the determination vehicle speed Vht1, the steering angle of the wheel 12F is controlled so as to follow the locus denoted by (2) of FIG. 15 and to be $\delta_W 2$ at the moment when the vehicle speed becomes V2.

As described above, in the present embodiment, when the difference $\Delta\delta_W$ between the actually measured steering angle and the calculated steering angle is comparatively large (that is, when the deviation between the actually measured steering angle and the calculated steering angle is comparatively large), switching from the second mode to the first mode is made at a higher vehicle speed (Vht2). On the other hand, when the difference $\Delta\delta_W$ is comparatively small (that is, when the deviation between the actually measured steering angle and the calculated steering angle is comparatively small), switching from the second mode to the first mode is made at a vehicle speed (Vht1) lower than Vht2 but higher than V2. When there is not a significant difference between the actually measured steering angle and the calculated steering angle, the mode switching is made at V2.

According to the above first embodiment, vehicle motion characteristics with respect to the operation of the steering wheel 41a are not changed at switching from the second mode to the first mode, so that it is possible to make the mode switching without giving any sense of incompatibility to the occupant.

Figure 16:
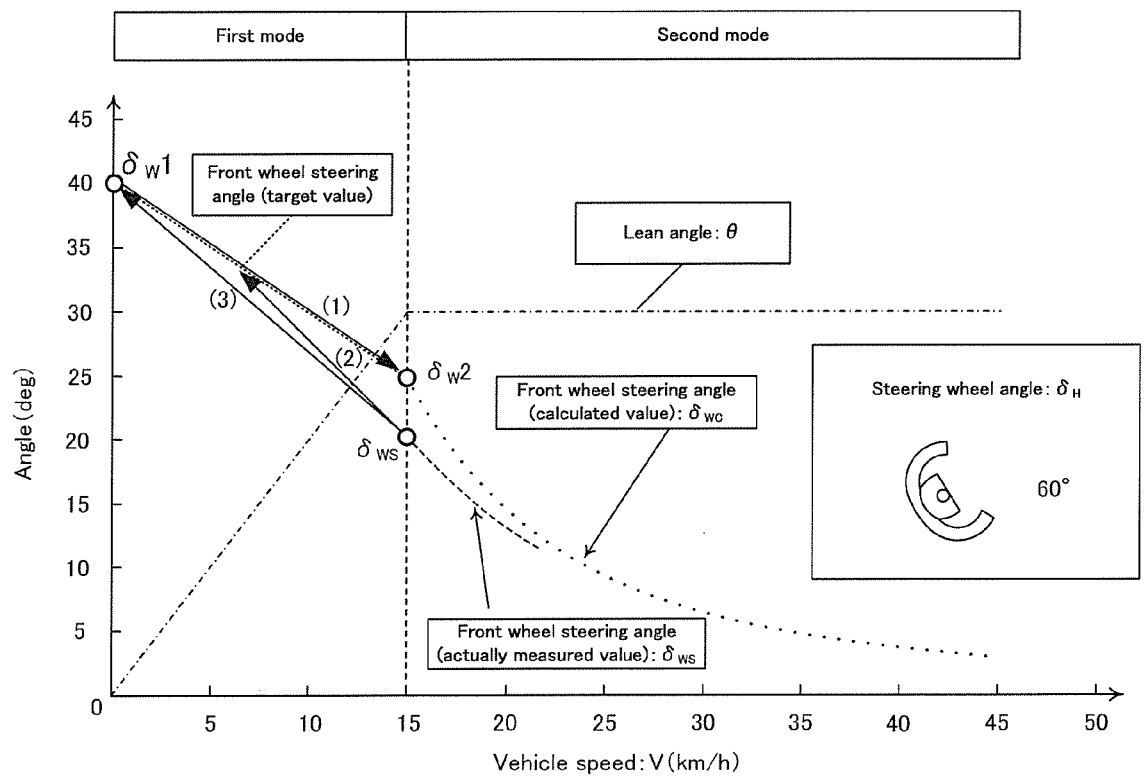
FIG. 16 is a view for explaining switching from the second mode to the first mode in the vehicle 10 according to a second embodiment of the present invention.

The following describes a second embodiment of the present invention. FIG. 16 is a view for explaining switching from the second mode to the first mode in the vehicle 10 according to a second embodiment of the present invention.

In FIG. 16 as well, it is assumed that the steering wheel angle of the steering wheel 41a is set to 60° to the right.

(1) of FIG. 16 denotes the time period during which the vehicle speed of the vehicle 10 is increased from V1 to V2. At the moment when the vehicle speed becomes V2, the steering angle of the wheel 12F becomes $\delta_W 2$ and, at the same time, the first mode is switched to the second mode, whereby the wheel 12F is made freely turnable irrespective of the steering wheel 41a.

The following describes control of the vehicle 10 according to the present embodiment, taking a case where the first mode is switched to the second mode, then the vehicle 10 travels for a predetermined period of time in the second mode, and the vehicle speed is reduced to equal to or less than V2.

Here, the target steering angle (locus denoted by the dotted line in the first mode) of the wheel 12F between the vehicle speed V1 and the vehicle speed V2, i.e., during the first mode is considered. In FIG. 16, the target steering angle is a liner function passing through two points (V1, $\delta_W 1$) and (V2, $\delta_W 2$), so that the target steering angle of the wheel 12F with respect to the vehicle speed V can be calculated according to the following equation (12).

[Numeral 12]

$$\delta_W(V) = \frac{\delta_W 2 - \delta_W 1}{V2 - V1} V + \frac{\delta_W 1 \cdot V2 - \delta_W 2 \cdot V1}{V2 - V1} \quad (12)$$

Although the target steering angle of the wheel 12F is determined by a linear function as described above, the target steering angle of the wheel 12F in the first mode is not limited to a linear function.

The steering angle of the wheel 12F detected by the front wheel steering angle sensor 124 is assumed to be $\delta_{WS}$. The steering angle $\delta_{WC}$ of the wheel 12F is detected by the front wheel steering angle sensor 124 in the second mode or at mode switching to the first mode at which the vehicle speed is reduced to V2 after the vehicle 10 travels for a predetermined time period in the second mode.

In the present embodiment, when the steering angle ($\delta_{WS}$) of the wheel 12F detected by the front wheel steering angle sensor 124 differs from the target steering angle ($\delta_W 2$) of the wheel 12F in the first mode (that is, when $\delta_{WS} \neq \delta_W 2$ is satisfied), the steering angle of the wheel 12F is corrected so as to continuously approach the target steering angle (e.g., target steering angle of the wheel 12F expressed by the equation (12)) of the wheel 12F.

The above phrase "the steering angle of the wheel 12F is made to continuously approach the target steering angle of the wheel 12F" refers not to "the steering angle of the wheel 12F is made to approach the target steering angle of the wheel 12F in a discontinuous or stepwise manner". For example, in the present embodiment, the wheel 12F is controlled so as to follow the loci denoted by (2) and (3) of FIG. 16 and to be made to approach the target steering angle of the wheel 12F expressed by the equation (12).

According to the above second embodiment, it is possible to make the mode switching without reducing the second mode region where stable traveling can be ensured and without giving a sense of incompatibility to the occupant.

Figure 17:
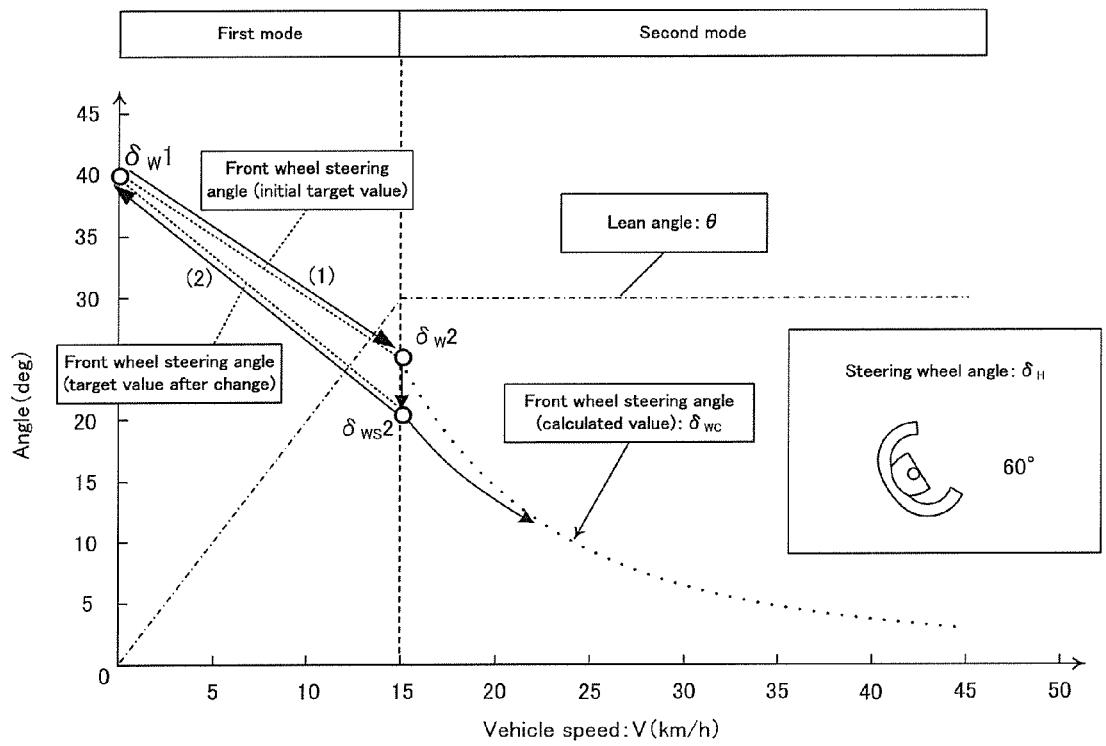
FIG. 17 is a view for explaining switching from the second mode to the first mode in the vehicle 10 according to a third embodiment of the present invention.

The following describes a third embodiment of the present invention. FIG. 17 is a view for explaining switching from the second mode to the first mode in the vehicle 10 according to a third embodiment of the present invention.

In FIG. 17 as well, it is assumed that the steering wheel angle of the steering wheel 41a is set to 60° to the right.

(1) of FIG. 17 denotes the time period during which the vehicle speed of the vehicle 10 is increased from V1 to V2. At the moment when the vehicle speed becomes V2, the steering angle of the wheel 12F becomes $\delta_W 2$ and, at the same time, the first mode is switched to the second mode, whereby the wheel 12F is made freely turnable irrespective of the steering wheel 41a.

The following describes control of the vehicle 10 according to the present embodiment, taking a case where the first mode is switched to the second mode, then the vehicle 10 travels for a predetermined period of time in the second mode, and the vehicle speed is reduced to equal to or less than V2.

Here, the target steering angle (locus denoted by the dotted line in the first mode) of the wheel 12F between the vehicle speed V1 and the vehicle speed V2, i.e., during the first mode is considered. In FIG. 17, the target steering angle is a liner function passing through two points (V1, $\delta_W 1$) and (V2, $\delta_W 2$), so that the target steering angle of the wheel 12F with respect to the vehicle speed V can be calculated according to the above equation (12).

Although the target steering angle of the wheel 12F is determined by a linear function as described above, the target steering angle of the wheel 12F in the first mode is not limited to a linear function.

The steering angle of the wheel 12F detected by the front wheel steering angle sensor 124 is assumed to be $\delta_{WS}$. When the target steering angle $\delta_W 2$ is shifted to a steering angle $\delta_{WS} 2$ at the moment when the wheel 12F is made freely turnable irrespective of the steering wheel 41a due to mode switching from the first mode to the second mode, this steering angle $\delta_{WS} 2$ is detected by the front wheel steering angle sensor 124, and the detected value is logged. The steering angle $\delta_{WS} 2$ is referred to as "steering angle at mode switching" in the appended claims.

The wheel 12F is estimated to have the logged steering angle $\delta_{WS} 2$ in the second mode or at mode switching to the first mode at which the vehicle speed is reduced to V2 after the vehicle 10 travels for a predetermined time period in the second mode.

Thus, in the present embodiment, in the first mode when the vehicle speed is reduced from V2 to V1 after mode switching from the second mode to the first mode, control based on the initial target value (expressed by the equation (12)) of the target steering angle of the wheel 12F is switched to control based on a target value of the steering angle of the wheel 12F after change which is determined based on the point (V2, $\delta_{WS} 2$).

More specifically, the target steering angle of the wheel 12F after change is a liner function passing through two points (V1, $\delta_W 1$) and (V2, $\delta_{WS} 2$), so that the target steering angle of the wheel 12F with respect to the vehicle speed V can be calculated according to the following equation (13).

[Numeral 13]

$$\delta_W(V) = \frac{\delta_{WS}2 - \delta_W 1}{V2 - V1}V + \frac{\delta_W 1 \cdot V2 - \delta_{WS}2 \cdot V1}{V2 - V1} \qquad (13)$$

Thus, in the present embodiment, during a time period after the second mode is switched to the first mode, the wheel 12F is controlled so as to follow the locus (locus denoted by (2) of FIG. 17) based on the target steering angle of the wheel 12F expressed by the equation (13).

According to the above third embodiment, it is possible to make the mode switching without reducing the second mode region where stable traveling can be ensured and without giving a sense of incompatibility to the occupant.

The following describes a fourth embodiment of the present invention. In the first embodiment, the vehicle speed is reduced after the vehicle 10 travels for a predetermined time period in the second mode, and when the second mode is switched to the first mode, the mode switching is made in an earlier stage according to the value of the difference $\Delta\delta_W$ as needed so that the steering angle of the wheel 12F at V2 is $\delta_W 2$. On the other hand, in the fourth embodiment, the steering angle of the wheel 12F at V2 is controlled to be the steering angle $\delta_{WS}2$ described in the third embodiment.

According to the above fourth embodiment, vehicle motion characteristics with respect to the operation of the steering wheel 41a are not changed at switching from the second mode to the first mode. Further, it is possible to make the mode switching without reducing the second mode region where stable traveling can be ensured and without giving a sense of incompatibility to the occupant.

REFERENCE SIGNS LIST

10: Vehicle
11: Boarding part
11a: Seat
11b: Foot rest
11c: Windshield
12F: Wheel
12R: Wheel
12L: Wheel
17: Front wheel fork
18: Road surface
20: Main body part
21: Central vertical member
25: Lean motor
30: Link mechanism
33L: Vertical link unit
33R: Vertical link unit
31U: Lateral link unit
31D: Lateral link unit
41: Maneuvering device
41a: Steering wheel
45: Accelerator
46: Brake
47: Shift switch
51L: Rotation drive device
51R: Rotation drive device
65: Steering motor
100: Vehicle ECU
101: Rotation drive device ECU
102: Lean motor ECU
103: Steering motor ECU
122: Vehicle speed sensor
123: Steering wheel operation angle sensor
124: Front wheel steering angle sensor
125: Lean angle sensor
145: Accelerator position sensor
146: Brake position sensor
147: Shift switch position sensor

The invention claimed is:

1. A vehicle comprising:
a vehicle body having three or more wheels including at least a steered wheel with a trail and a pair of wheels provided in the vehicle width direction;
an operation input part that inputs a turning direction when being operated;
an inclining part that inclines the vehicle body; and
a steered wheel controller that controls the steering angle of the steered wheel, wherein
when the vehicle speed of the vehicle is lower than a predetermined vehicle speed, the vehicle travels in a first mode in which the steered wheel controller controls the steering angle of the steered wheel according to an input from the operation input part, and the inclining part inclines the vehicle body according to an input from the operation input part,
when the vehicle speed is equal to or higher than the predetermined vehicle speed, the vehicle travels in a second mode in which the steered wheel controller makes the steered wheel freely turnable irrespective of the operation input part, and the inclining part inclines the vehicle body according to an input from the operation input part, and
a turning radius based on the inclination angle of the vehicle body at the predetermined vehicle speed in the second mode is estimated, then the steering angle of the steered wheel at the predetermined vehicle speed is calculated from the estimated turning radius, and the steered wheel is controlled until the calculated steering angle is reached.

2. The vehicle according to claim 1, wherein
in the first mode, the inclination angle of the vehicle body gradually increases along with an increase in the vehicle speed to be the inclination angle of the vehicle body at the predetermined vehicle speed in the second mode.

3. The vehicle according to claim 1, wherein
the operation input part detects an input steering angle which is an angle to be steered, and the inclining part inclines the vehicle body at a constant imaginary gear ratio with respect to the input steering angle in the second mode.

4. The vehicle according to claim 1, wherein
the steered wheel is a front wheel.

5. The vehicle according to claim 1, wherein
the inclining part inclines the pair of wheels to incline the vehicle body.

6. The vehicle according to claim 1, wherein
the vehicle travels in the first mode when being moved back.

7. The vehicle according to claim 1, wherein
the predetermined speed at switching from the first mode to the second mode and the predetermined speed at switching from the second mode to the first mode differ from each other.

8. The vehicle according to claim 7, wherein
when a deviation exists by a predetermined value or more between a detected steering angle of the steered wheel and a calculated steering angle of the steered wheel in the second mode, the predetermined vehicle speed at switching from the second mode to the first mode is set higher than the predetermined vehicle speed at switching from the first mode to the second mode.

9. The vehicle according to claim 1, wherein
when the steering angle of the steered wheel detected at switching from the second mode to the first mode differs from a target steering angle of the steered wheel in the first mode, the steering angle of the steered wheel is corrected so as to continuously approach the target steering angle of the steered wheel.

10. The vehicle according to claim 1, wherein
the steering angle of the steered wheel at switching from the first mode to the second mode is detected, and a target steering angle of the steered wheel is changed in the first mode according to the steering angle at switching.

* * * * *